(12) United States Patent
Ohara et al.

(10) Patent No.: US 8,832,396 B2
(45) Date of Patent: Sep. 9, 2014

(54) STORAGE APPARATUS AND ITS CONTROL METHOD

(75) Inventors: Masayoshi Ohara, Odawara (JP); Koji Nagata, Kaisei (JP); Kosuke Sakai, Isehara (JP)

(73) Assignee: Hitachi, Ltd., Tokyo (JP)

( * ) Notice: Subject to any disclaimer, the term of this patent is extended or adjusted under 35 U.S.C. 154(b) by 273 days.

(21) Appl. No.: 13/377,000

(22) PCT Filed: Nov. 25, 2011

(86) PCT No.: PCT/JP2011/006577
§ 371 (c)(1),
(2), (4) Date: Dec. 8, 2011

(87) PCT Pub. No.: WO2013/076782
PCT Pub. Date: May 30, 2013

(65) Prior Publication Data
US 2013/0138916 A1    May 30, 2013

(51) Int. Cl.
*G06F 12/16* (2006.01)
*G06F 11/14* (2006.01)

(52) U.S. Cl.
CPC ........ *G06F 11/1456* (2013.01); *G06F 11/1451* (2013.01)
USPC ....................................... 711/162

(58) Field of Classification Search
None
See application file for complete search history.

(56) References Cited

U.S. PATENT DOCUMENTS

| 7,849,057 | B1 | 12/2010 | Kazar et al. |
| 2006/0080503 | A1 | 4/2006 | Araki et al. |
| 2009/0327357 | A1 | 12/2009 | Beglin et al. |

FOREIGN PATENT DOCUMENTS

| EP | 1645960 A1 | 4/2006 |
| JP | 2006-113667 A | 4/2006 |

*Primary Examiner* — Duc Doan
(74) *Attorney, Agent, or Firm* — Mattingly & Malur, PC

(57) ABSTRACT

A controller for the storage apparatus: creates a second logical volume in a storage area provided by one or more storage devices; stores management information of a snapshot of a first logical volume, which is to be provided to a host computer, in the second logical volume; and reads the management information of a necessary snapshot from the second logical volume to a memory when needed, executes processing using the read management information, and returns the management information, which becomes no longer necessary, from the memory to the second logical volume. When reading the management information of the necessary snapshot from the second logical volume to the memory when needed, the controller changes the number of generations and address range of the snapshot of the management information to be read to the memory according to a generation and address of the snapshot whose management information is required.

14 Claims, 31 Drawing Sheets

FIG.6

| PAIR STATUS | PN0 | PN1 | PN2 | ... | PN1023 |
|---|---|---|---|---|---|
| LUN | 2 | 1 | 3 | ... | - |
| ... | ... | ... | ... | ... | ... |

Status row: Split, Split, Paired, ..., Simplex (20A columns; 20B=PAIR STATUS, 20C=LUN, 20D=...; table 20)

FIG.7

| LBA | GENE-RATION #0 | GENE-RATION #1 | GENE-RATION #2 | .... | GENE-RATION #1023 |
|---|---|---|---|---|---|
| 0 | 1 | 0 | 1 | .... | 0 |
| 1 | 1 | 1 | 1 | .... | 0 |
| 2 | 1 | 1 | 1 | .... | 0 |
| .... | .... | .... | .... | .... | 0 |
| N | 0 | 0 | 0 | .... | 0 |

FIG.8

| LBA | DIFFERENCE BIT |
|---|---|
| 0 | 0 |
| 1 | 1 |
| 2 | 0 |
| .... | .... |
| N | 0 |

FIG.9

| LBA | GENE-RATION #0 | GENE-RATION #1 | GENE-RATION #2 | .... | GENE-RATION #1023 |
|---|---|---|---|---|---|
| 0-15 | 1 | 0 | 0 | .... | 0 |
| 16-31 | 0 | 0 | 1 | .... | 0 |
| 32-47 | 0 | 0 | 0 | .... | 0 |
| .... | .... | .... | .... | .... | .... |
| 1008-1023 | 0 | 0 | 0 | .... | 0 |

FIG.10

| LBA | GENE-RATION #0 | GENE-RATION #1 | GENE-RATION #2 | .... | GENE-RATION #1023 |
|---|---|---|---|---|---|
| 0 | 100 | 100 | 100 | .... | 0 |
| 1 | 150 | 150 | 80 | .... | 0 |
| 2 | 0 | 0 | 0 | .... | 0 |
| .... | .... | .... | .... | .... | .... |
| N | 240 | 240 | 240 | .... | 240 |

FIG. 11

| | | | | | | | |
|---|---|---|---|---|---|---|---|
| 25A { | 1 | 1 | 0 | 0 | .... | 1 | 1 |
| | 1 | 1 | 1 | 1 | .... | 0 | 1 |
| 25A { | 1 | 1 | 0 | 0 | .... | 0 | 0 |
| | 0 | 0 | 0 | 0 | .... | 0 | 0 |
| 25A { | 0 | 0 | 0 | 0 | .... | 0 | 0 |
| | 0 | 0 | 0 | 0 | .... | 0 | 0 |
| | .... | .... | .... | .... | .... | .... | .... |

25AA (top right), 25AA, 25AA, 25

FIG.12

(A) SNAPSHOT DIFFERENCE BITMAP 21

| | GENE-RATION #0 | GENE-RATION #1 | GENE-RATION #2 | ... | GENE-RATION #1023 |
|---|---|---|---|---|---|
| | 0 | 0 | 0 | ... | 0 |
| | 1 | 1 | 1 | ... | 1 |
| | 0 | 0 | 0 | ... | 1 |
| ... | ... | ... | ... | ... | ... |
| | 1 | 1 | 1 | ... | 1 |

21BA, 21B (B) SNAPSHOT DIFFERENCE AGGREGATED BITMAP 23

| | GENE-RATION #0 | GENE-RATION #1 | GENE-RATION #2 | ... | GENE-RATION #1023 |
|---|---|---|---|---|---|
| | 0 | 0 | 0 | ... | 0 |

23B, 23BA (C) OLD DATA SAVING ADDRESS TABLE 24

| | GENE-RATION #0 | GENE-RATION #1 | GENE-RATION #2 | ... | GENE-RATION #1023 |
|---|---|---|---|---|---|
| | 0 | 0 | 0 | ... | 0 |
| | 150 | 150 | 80 | ... | 70 |
| | 0 | 0 | 0 | ... | 120 |
| ... | ... | ... | ... | ... | ... |
| | 5 | 5 | 5 | ... | 240 |

(A) SNAPSHOT DIFFERENCE BITMAP 21

| | GENE-RATION #0 | GENE-RATION #1 | GENE-RATION #2 | ... | GENE-RATION #1023 |
|---|---|---|---|---|---|
| | 1 | 1 | 1 | ... | 1 |
| | 0 | 0 | 0 | ... | 1 |
| | 1 | 1 | 1 | ... | 1 |
| ... | ... | ... | ... | ... | ... |
| | 1 | 1 | 1 | ... | 1 |

K1A, 21BA, 21B (B) SNAPSHOT DIFFERENCE AGGREGATED BITMAP 23

| GENE-RATION #0 | GENE-RATION #1 | GENE-RATION #2 | ... | GENE-RATION #1023 |
|---|---|---|---|---|
| 1 | 1 | 1 | ... | 1 |

K2A, 23B, 23BA (C) OLD DATA SAVING ADDRESS TABLE 24

| | GENE-RATION #0 | GENE-RATION #1 | GENE-RATION #2 | ... | GENE-RATION #1023 |
|---|---|---|---|---|---|
| | 100 | 100 | 100 | ... | 120 |
| | 150 | 150 | 80 | ... | 70 |
| | 0 | 0 | 0 | ... | 120 |
| ... | ... | ... | ... | ... | ... |
| | 5 | 5 | 5 | ... | 240 |

| LBA | UNREFLECTED BIT |
|---|---|
| 0 | 0 |
| 1 | 0 |
| 2 | 1 |
| .... | .... |
| N | 1 |

26AA { (rows 0, 1)  26BA } (rows 0, 1)

| SPLIT ORDER NUMBER | 0 | 1 | 2 | 3 | 4 | ..... | 1023 |
|---|---|---|---|---|---|---|---|
| GENERATION NUMBER | 0 | 2 | 3 | 4 | 6 | ..... | 1023 |

27AA — 27BA

27 — 27A, 27B

| LBA | GENE-RATION #0 | GENE-RATION #1 | GENE-RATION #2 | .... | GENE-RATION #1023 |
|---|---|---|---|---|---|
| 0 | 0 | 0 | 1 | .... | 0 |
| 1 | 0 | 1 | 0 | .... | 0 |
| 2 | 0 | 0 | 0 | .... | 0 |
| .... | .... | .... | .... | .... | .... |
| 0 | 0 | 0 | 0 | .... | 0 |

28AA { (rows 1-2 left), 28BA } (rows 1-2 right)
28A (col 1), 28B (cols 2-5)
28

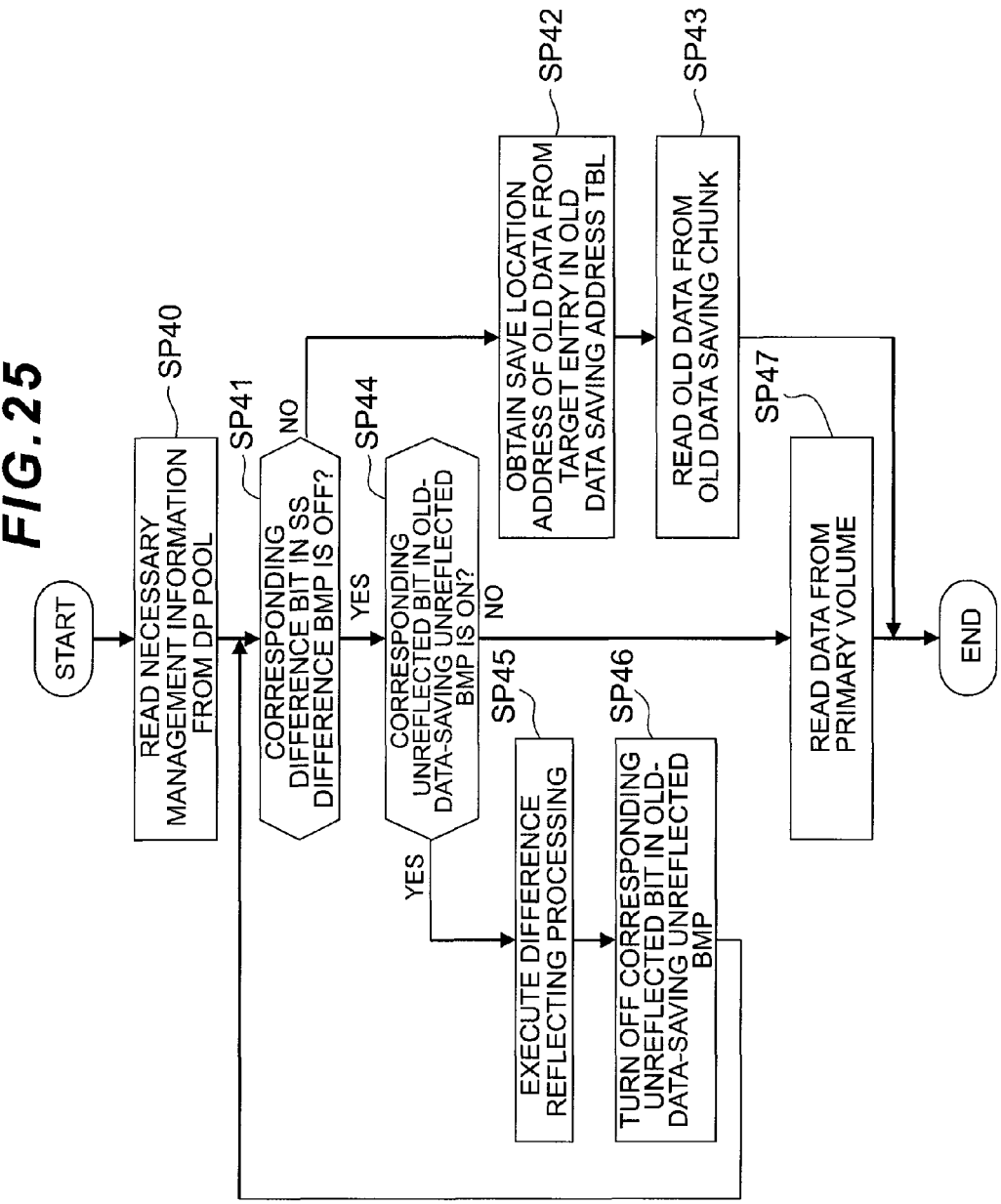

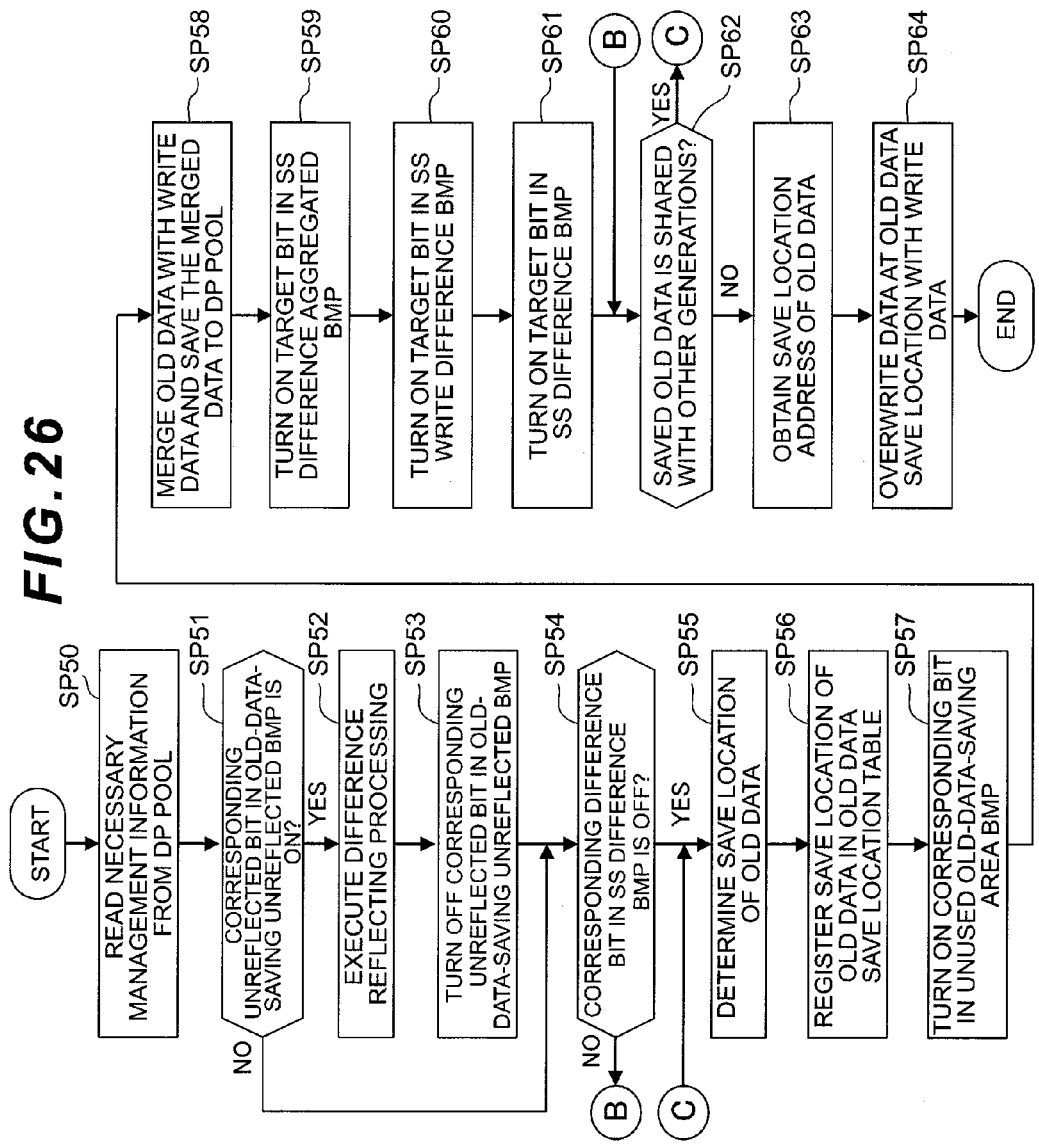

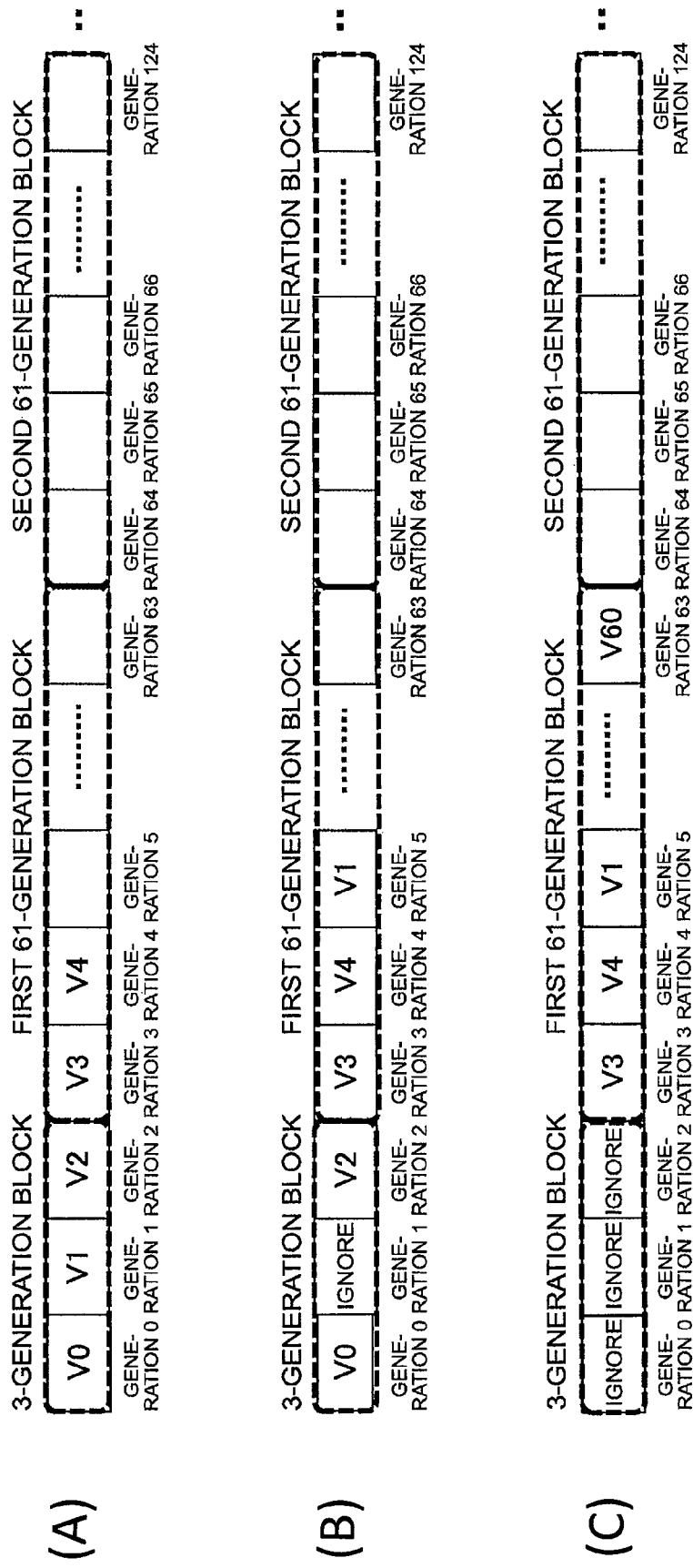

STORAGE APPARATUS AND ITS CONTROL METHOD

TECHNICAL FIELD

The present invention relates to a storage apparatus and its control method and is suited for use in, for example, a disk array apparatus equipped with a snapshot function.

BACKGROUND ART

One of conventional functions of a disk array apparatus is a so-called snapshot function that retains an image of a logical volume (hereinafter referred to as the primary volume) at a point in time designated when receiving an instruction to obtain a snapshot. When data is lost due to a human-caused mistake or a state of a file system at a desired point in time needs to be restored, the snapshot function is used to restore the primary volume at that point in time.

If a snapshot is obtained by the snapshot function, data of the primary volume before being overwritten (hereinafter referred to as the old data) is then saved to a logical volume for saving the old data when data is written to the primary volume. Specifically speaking, the difference between the primary volume at the point in time when receiving an instruction to obtain the snapshot, and the present primary volume is saved as the old data to the old-data-saving logical volume. Accordingly, a data image (snapshot) of the primary volume at the point in time when obtaining the snapshot can be restored by combining data stored in the present primary volume and the old data stored in the old-data-saving logical volume.

Such a snapshot function has the advantage of being capable of restoring the primary volume at the point in time when receiving the instruction to obtain the snapshot, by using a smaller storage capacity than a case where the content of the entire primary volume is stored as it is.

CITATION LIST

Patent Literature

[PTL 1]
Japanese Patent Application Laid-Open (Kokai) Publication No. 2006-113667

SUMMARY OF INVENTION

Technical Problem

Meanwhile, the disk array apparatus equipped with the above-described snapshot function retains various pieces of information in a memory as information for managing the obtained snapshots (see PTL 1).

Many of these pieces of management information are provided for each snapshot. Therefore, as the number of snapshots that can be obtained in the disk array apparatus increases, the capacity of the entire management information for managing the snapshots also increases.

However, the capacity of the memory for retaining these pieces of management information is limited and it is impossible to retain an unlimited amount of management information of the snapshots in the memory. So, the problem is that the number of snapshots which can be obtained in the disk array apparatus is limited to a certain degree.

The present invention was devised in consideration of the above-described circumstances and aims at suggesting a storage apparatus and its control method capable of obtaining more snapshots.

Solution to Problem

In order to solve the above-described problem, a storage apparatus according to the present invention includes: one or more storage devices for providing a storage area; and a controller for creating first and second logical volumes in the storage area provided by the one or more storage devices and reading data from and/or writing data to the first logical volume in response to a request from a host computer, and the controller is equipped with a memory; wherein the controller: obtains one or more snapshots, which are data images of the first logical volume at a certain point in time, and stores management information of each obtained snapshot in the second logical volume; and reads the management information of a necessary snapshot from the second logical volume when needed, executes processing using the read management information, and returns the management information, which becomes no longer necessary, from the memory to the second logical volume; and on the other hand, when reading the management information of the snapshot from the second logical volume to the memory, the controller changes the number of generations and address range of the snapshot of the management information to be read to the memory according to a generation and address of the snapshot whose management information is required.

Furthermore, provided according to the present invention is a method for controlling a storage apparatus which includes one or more storage devices for providing a storage area, and a controller for creating a first logical volume in the storage area provided by the one or more storage devices and reading data from and/or writing data to the first logical volume in response to a request from a host computer, and the controller is equipped with a memory. The storage apparatus control method includes: a first step executed by the controller creating a second logical volume in the storage area provided by the one or more storage devices; a second step executed by the controller obtaining one or more snapshots, which are data images of the first logical volume at a certain point in time, and storing management information of each obtained snapshot in the second logical volume; and a third step executed by the controller reading the management information of a necessary snapshot from the second logical volume when needed, executing processing using the read management information, and returning the management information, which becomes no longer necessary, from the memory to the second logical volume; and wherein in the third step, when reading the management information of the snapshot from the second logical volume to the memory, the controller changes the number of generations and address range of the snapshot of the management information to be read to the memory according to a generation and address of the snapshot whose management information is required.

The storage apparatus and its control method according to the present invention is designed so that the management information of snapshots is retained in the second logical volume and only necessary management information is read to the memory in the controller when needed. So, the number of snapshots that can be obtained is not limited by the capacity of the memory.

Advantageous Effects of Invention

The present invention can realize a storage apparatus and its control method capable of obtaining more snapshots.

BRIEF DESCRIPTION OF DRAWINGS

FIG. 6 is a conceptual diagram showing the structure of a pair management table.

FIG. 7 is a conceptual diagram showing the structure of a snapshot difference bitmap.

FIG. 8 is a conceptual diagram showing the structure of a primary volume difference bitmap.

FIG. 9 is a conceptual diagram showing the structure of a snapshot difference aggregated bitmap.

FIG. 10 is a conceptual diagram showing the structure of an old data saving address table.

FIG. 11 is a conceptual diagram showing the structure of an unused old-data-saving area bitmap.

FIGS. 12 (A) to (C) are conceptual diagrams for explaining an old-data-saving unreflected bitmap.

FIGS. 13 (A) to (C) are conceptual diagrams for explaining the old-data-saving unreflected bitmap.

FIG. 15 is a conceptual diagram showing the structure of the old-data-saving unreflected bitmap.

FIG. 17 is a conceptual diagram showing the structure of the split order number-generation number mapping table.

FIG. 25 is a flowchart illustrating a processing sequence for second snapshot read processing.

FIG. 26 is a flowchart illustrating a processing sequence for snapshot write processing.

FIGS. 30 (A) to (C) are conceptual diagrams for explaining a system for assigning the generation number to snapshots.

DESCRIPTION OF EMBODIMENTS

An embodiment of the present invention will be explained in detail with reference to the attached drawings.

(1) Computer System According to this Embodiment

Figure 1:
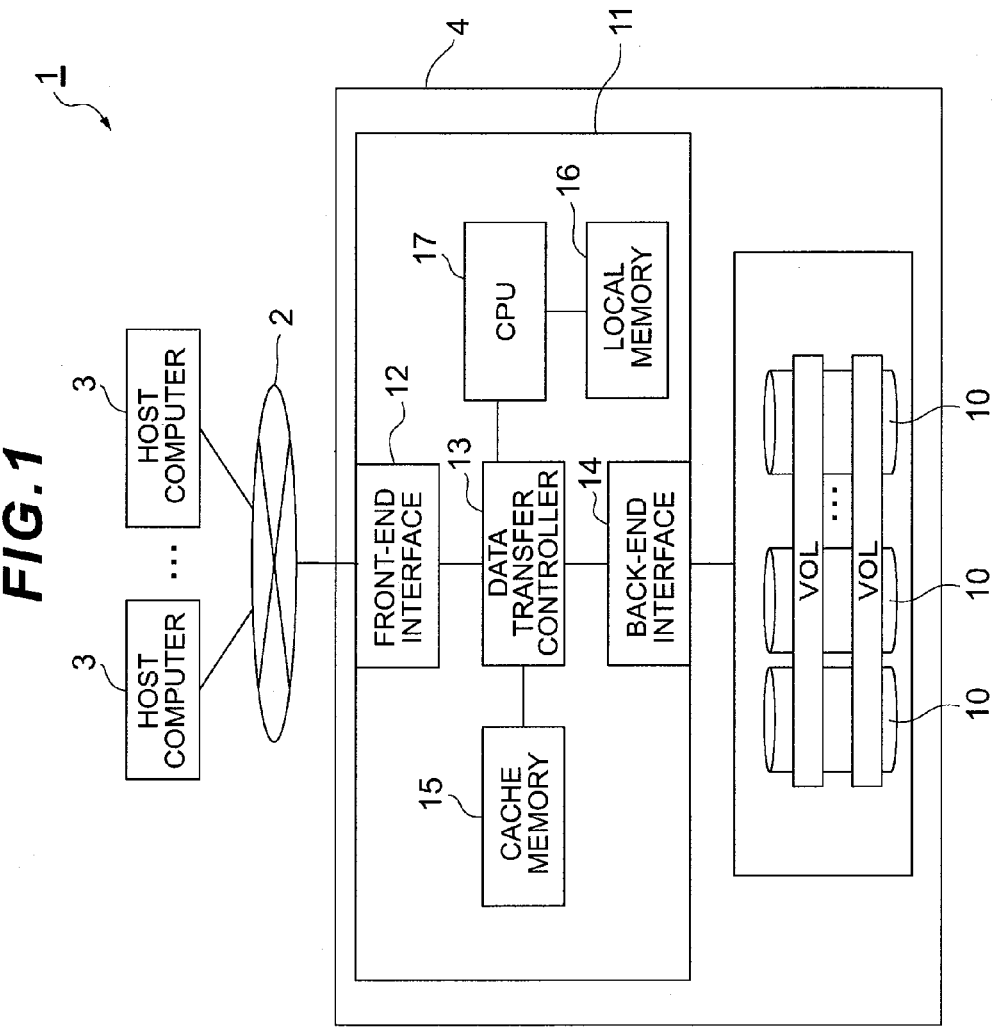
FIG. 1 is a block diagram showing an overall configuration of a computer system according to this embodiment.

Referring to FIG. 1, the reference numeral 1 represents a computer system according to this embodiment as a whole. This computer system 1 includes a host computer 3 and a disk array apparatus 4 which are connected via one or more networks 2.

The network 2 is composed of, for example, a SAN (Storage Area Network), a LAN, the Internet, public lines, or private lines. For example, if the network 2 is a SAN, communication between the host computer 3 and the disk array apparatus 4 via this network 2 is performed according to Fibre Channel Protocol; and if the network 2 is a LAN, communication between the host computer 3 and the disk array apparatus 4 via this network 2 is performed according to TCP/IP (Transmission Control Protocol/Internet Protocol).

The host computer 3 is a computer device equipped with information processing resources such as a CPU (Central Processing Unit) and a memory, and is composed of, for example, a personal computer, a workstation, or a mainframe. The host computer 3 includes information input devices (not shown in the drawing) such as a keyboard, a switch, a pointing device, and/or a microphone, and information output devices (not shown in the drawing) such as a monitor display and a speaker.

The disk array apparatus 4 includes a plurality of storage devices 10 and a controller 11 for controlling data input to, and/or output from, the plurality of storage devices 10.

The storage devices 10 are composed of, for example, expensive disk devices such as SCSI (Small Computer System Interface) disks or inexpensive disk devices such as SATA (Serial AT Attachment) disks and optical disks.

These storage devices 10 are operated by the controller 11 according to a RAID (Redundant Arrays of Inexpensive Disks) system. One or more logical volumes VOL are set to a physical storage area(s) provided by one or more storage devices 10. Then, data is stored in units of blocks of specified size (the size will be hereinafter set as 64 [KB]) in the logical volume(s) VOL (hereinafter referred to as the logical block(s)).

Each logical volume VOL is assigned its unique identification number (hereinafter referred to as the LUN [Logical Unit Number]) and each logical block is assigned its unique identification number within its corresponding logical volume (hereinafter referred to as the LBA [Logical Block Address]). In a case of this embodiment, data is input and/or output by using a combination of the LUN and the LBA as an address and designating that address.

Each controller 11 includes a front-end interface 12, a data transfer controller 13, a back-end interface 14, a cache memory 15, a local memory 16, and a CPU 17.

The front-end interface 12 has one or more communication ports connected to the network 2. The communication port is assigned its unique network address such as an IP (Internet Protocol) address or a WWN (World Wide Name). This front-end interface 12 has a function performing protocol control when communicating with the host computer 3 via the network 2. Because of the protocol control function of this front-end interface 12, data and commands are sent and received between the host computer 3 and the disk array apparatus 4 according to, for example, the FC protocol or the iSCSI protocol.

The data transfer controller 13 has a function switching the connection relationship between the front-end interface 12, the cache memory 15, the back-end interface 14, and the controller 17 under the control of the controller 11 and is composed of, for example, a PCIe (PCI [peripheral component interconnect] Express) switch.

The back-end interface 14 is an interface for the storage devices 10 and is equipped with information processing resources such as a CPU and a memory. This back-end interface 14 reads read data from or writes write data to an address position, which is designated by a read command or write command which is issued from the host computer 3 and sent from the front-end interface 12, within a logical volume VOL designated by the read command or the write command by controlling the corresponding storage devices 10 in response to the write command or the read command.

The cache memory 15 is composed of a volatile memory such as an SDRAM (Synchronous Dynamic Random Access Memory) and is mainly used to temporarily store data read from or written to the storage devices 10. Management information described later which is used to manage snapshots is also read from the storage devices 10 and stored and retained in this cache memory 15.

The local memory 16 is used to store various control programs and is also used to temporarily store various commands such as read commands and write commands issued from the host computer 3. The CPU 17 processes the read commands and the write commands retained in this local memory 16 in the order retained in the local memory 16. A snapshot control program described later is stored and retained in this local memory 16.

The CPU 17 is a processor that controls the entire operation of the disk array apparatus 4. The CPU 17 includes a plurality of cores. Each core executes a plurality of software threads in parallel in an appropriate software environment. One or more logical volumes VOL are allocated to each core. Then, each core takes charge of, for example, control of data read/write processing on the logical volume (s) VOL allocated to itself.

(2) Snapshot Function According to this Embodiment

Figure 2:
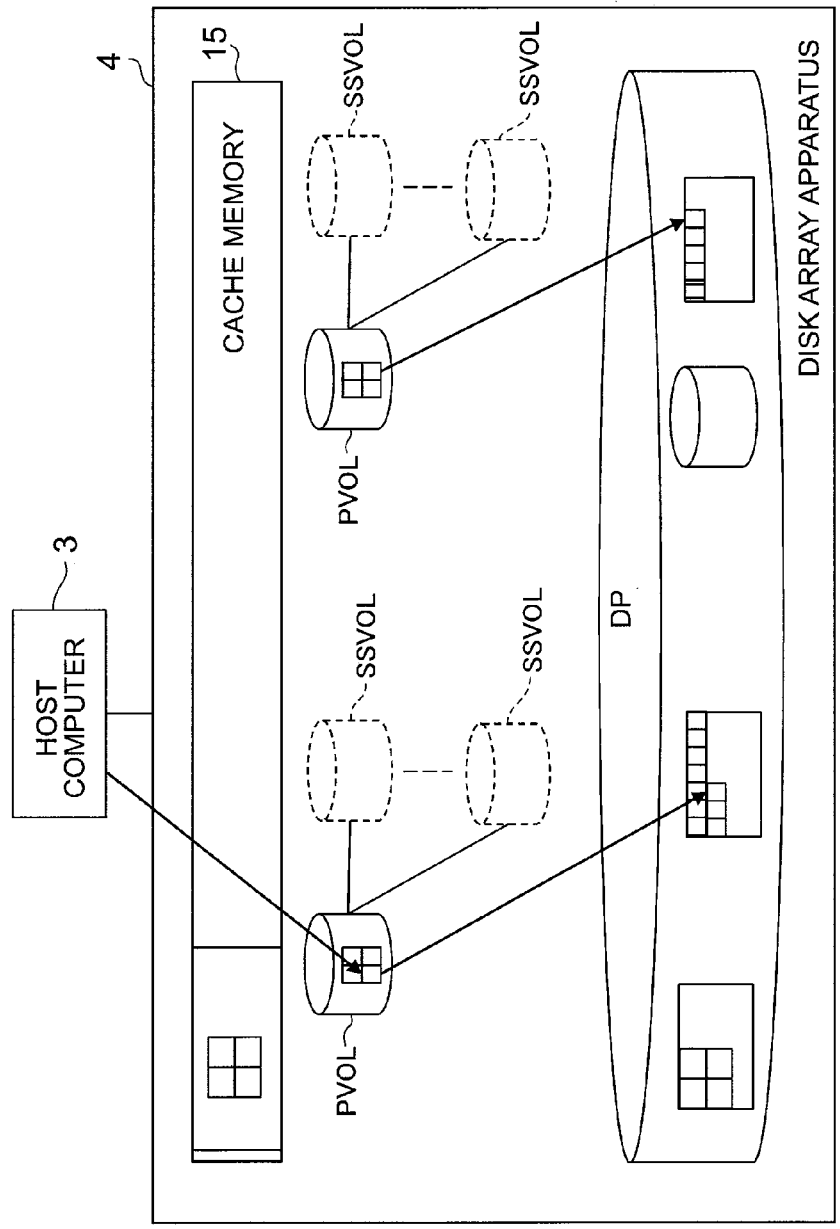
FIG. 2 is a conceptual diagram for explaining a logical structure of snapshots.

Next, the snapshot function of the disk array apparatus according to this embodiment will be explained.
(2-1) Logical Structure of Snapshots FIG. 2 shows a logical structure of snapshots in this disk array apparatus. In a case of this disk array apparatus 4, snapshots are composed of three volumes, that is, primary volumes PVOL, snapshot volumes SSVOL, and a data pool DP.

A primary volume PVOL is a logical volume which is provided to the host computer 3, and to which data from the host computer 3 is read and/or written. This primary volume PVOL may be either a normal logical volume VOL of entity or a virtual logical volume VOL without entity.

A snapshot volume SSVOL is a virtual logical volume retaining snapshot data and is set as a copy pair with a primary volume PVOL. Examples of the status of this copy pair (pair status) include "Paired," "Split," and "Simplex."

The state "Paired" indicates a state in which the primary volume PVOL and the snapshot volume SSVOL mirror each other; and the state "Split" indicates a state in which data is not written from the primary volume PVOL to the snapshot volume SSVOL. Accordingly, when the pair status of the copy pair is switched from "Paired" to "Split," a static data image of the primary volume PVOL at that point in time (that is, a snapshot) is retained by the snapshot volume SSVOL which forms that copy pair. In the following explanation, switching of the pair status of the copy pair from "Paired" to "Split" will be referred to as "splitting the snapshot volume SSVOL from the primary volume PVOL" or "obtaining a snapshot." Furthermore, "Simplex" indicates a state in which no snapshot is retained in the snapshot volume SSVOL, and the primary volume PVOL and the snapshot volume SSVOL are not "paired."

The data pool DP is a logical volume VOL in which the management information of snapshots and old data saved from the primary volume PVOL are stored. If a snapshot is obtained and then a write command whose target is the primary volume PVOL is issued to the disk array apparatus 4, data in the primary volume PVOL immediately before being updated by write processing based on that write command (old data) is saved to the data pool DP. As a result, the data image (snapshot) of the primary volume PVOL immediately before being updated by the write processing can be restored by combining the data saved to the data pool DP and data remaining in the primary volume PVOL (data which is not updated).

Incidentally, in the case of this embodiment, a maximum of 1024 snapshot volumes SSVOL can be set to the same primary volume PVOL in the disk array apparatus 4. Therefore, in the case of this embodiment, the disk array apparatus 4 can obtain a maximum of 1024 snapshots with respect to the same primary volume PVOL.

(2-2) System for Storing Data to Data Pool in Disk Array Apparatus

With this disk array apparatus 4 as described above, the management information of each snapshot, in addition to the old data saved from the primary volume PVOL, is also retained in the data pool DP. Then, when the management information of the snapshots becomes necessary, it is read from the data pool DP to the cache memory 15; and when the management of the snapshots becomes no longer necessary, it is returned to the data pool DP.

Figure 3:
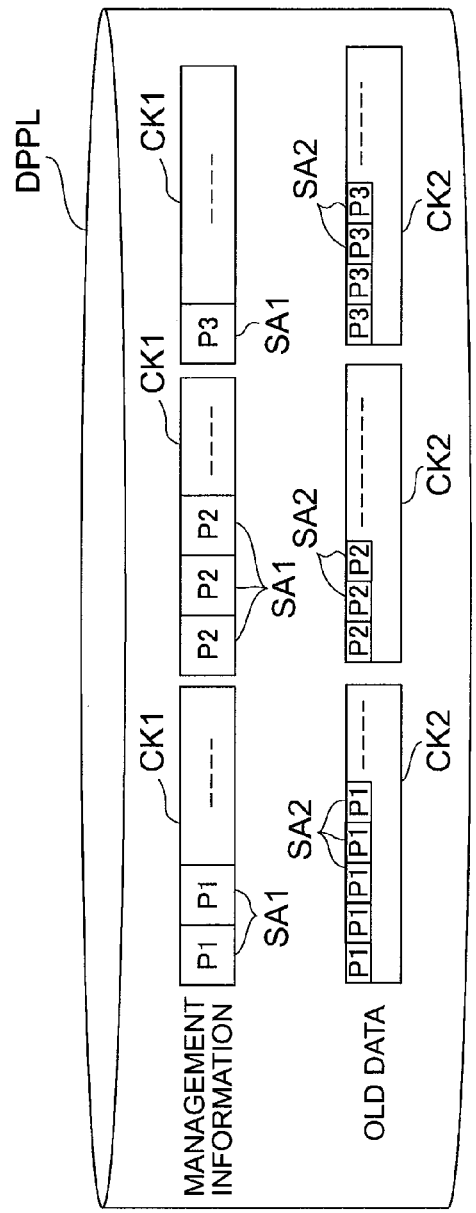
FIG. 3 is a conceptual diagram for explaining a system for storing management information and old data in a data pool in a disk array apparatus of the present invention.

FIG. 3 shows a system for storing the management information of each snapshot in the disk array apparatus 4 and the old data saved from the primary volume PVOL in the data pool DP.

This disk array apparatus 4 is configured as shown in FIG. 3 so that a storage area of the data pool DP is divided into a plurality of area units (hereinafter referred to as the chunks), each of which is formed in a specified size (for example, 1 [GB]), and is managed on a chunk basis. Every time a primary volume PVOL is created, chunk CK1 for storing the management information of snapshots obtained for that primary volume PVOL (hereinafter referred to as the management information storing chunk) and chunk CK2 for storing the old data saved from that primary volume PVOL (hereinafter referred to as the old data saving chunk) are respectively allocated to that primary volume PVOL.

Therefore, in the case of this disk array apparatus 4, a different management information storing chunk CK1 and a different old data saving chunk CK2 are allocated to each primary volume PVOL; and the management information of snapshots obtained for different primary volumes PVOL will not be stored in the same management information storing chunk CK1 and the old data saved from different primary volumes PVOL will not be stored in the same old data saving chunk CK2.

As a result, when the management information storing chunk CK1 and/or the old data saving chunk CK2 allocated to one primary volume PVOL become no longer necessary, for example, when the primary volume PVOL is deleted, this disk array apparatus 4 can release that management information storing chunk CK1 and/or the old data saving chunk CK2 regardless of the status of other primary volumes PVOL.

Figure 4:
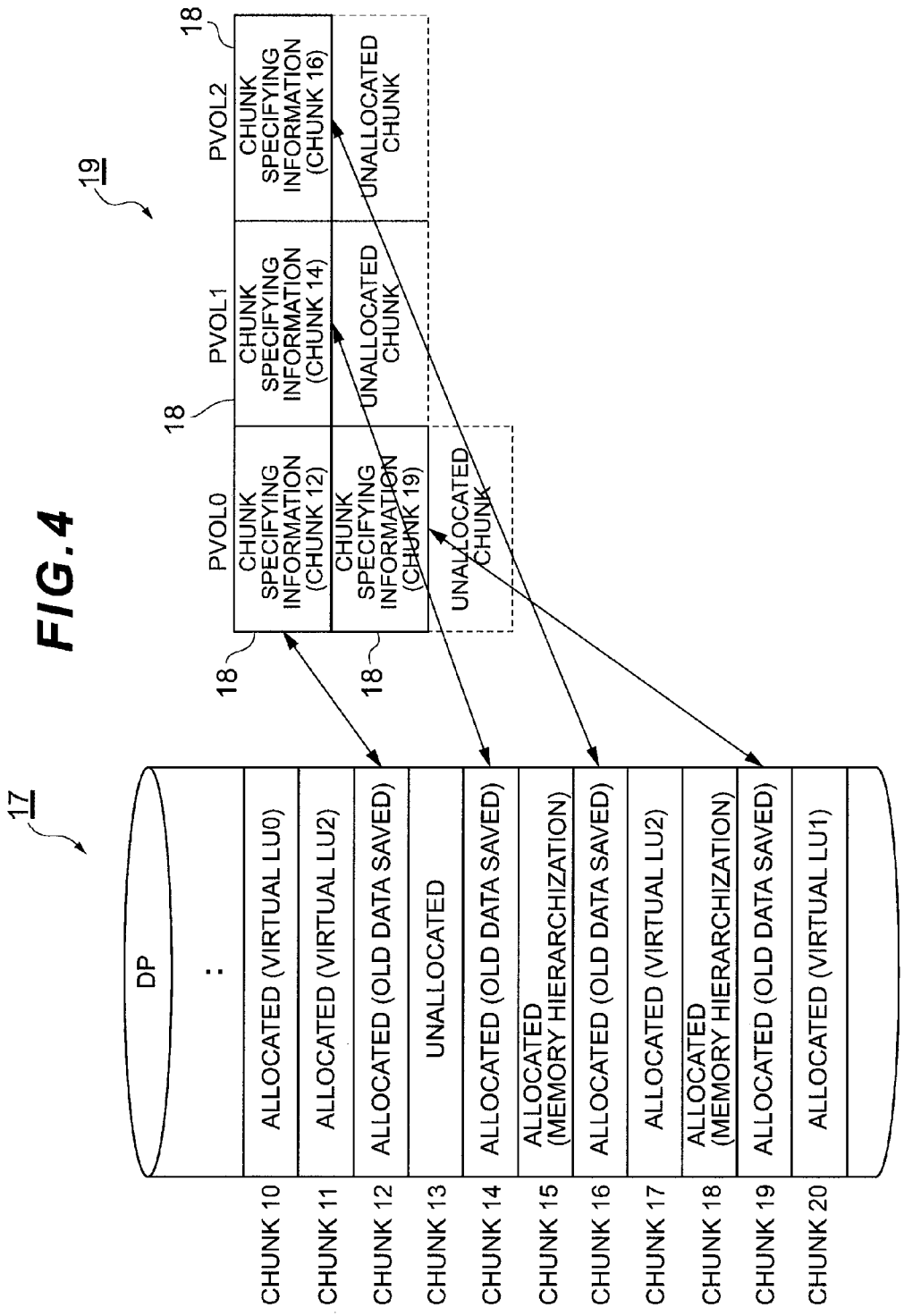
FIG. 4 is a conceptual diagram for explaining a method for managing each chunk in the data pool.

Incidentally, in the case of this disk array apparatus 4, chunk management information 17 for each data pool DP, which indicates for what purpose the individual chunks (including the management information storing chunk CK1 and the old data saving chunk CK2) in the data pool DP are used, and volume-allocated chunk specifying information 19 composed of chunk specifying information 18 for specifying the individual chunks allocated to each primary volume PVOL are retained in the cache memory 15 as shown in FIG. 4; and chunk allocation processing and other processing on the primary volume PVOL are executed based on the chunk management information 17 and the volume-allocated chunk specifying information 19.

Therefore, "releasing the chunk" means to change the status of that chunk in the chunk management information 17 to "unallocated," meaning that the relevant chunk is unused, and then delete the chunk specifying information 18 of the chunk associated with the corresponding primary volume in the corresponding volume-allocated chunk specifying information 19.

The management information storing chunk CK1 is allocated to a primary volume PVOL at the timing when the primary volume PVOL is created. Subsequently, at the timing when a first read access or write access is made to the primary volume PVOL after splitting a copy pair constituted from the primary volume PVOL and a snapshot volume SSVOL (after obtaining a snapshot), a storage area SA1 of a specified size unit (for example, 128 [MB] unit) in the management information storing chunk CK1 is allocated to that snapshot and the management information of the snapshot is stored in the storage area SA1.

Furthermore, the old data saving chunk CK2 is associated with the primary volume PVOL at the timing when it becomes necessary to save data, which is stored in the primary volume PVOL, to the data pool DR Subsequently, the old data saved from that primary volume PVOL will be sequentially stored in the old data saving chunk CK2. Incidentally, the old data is saved on a logical block basis (unit of 64 [KB]) from the primary volume PVOL. Therefore, when the old data is saved from one logical block of the primary volume PVOL, the size of a storage area SA2 allocated from the old data saving chunk CK2 as a storage location of that data is 64 [KB], which is the same size as that of the logical block.

(2-3) Snapshot Management Information

Figure 5:
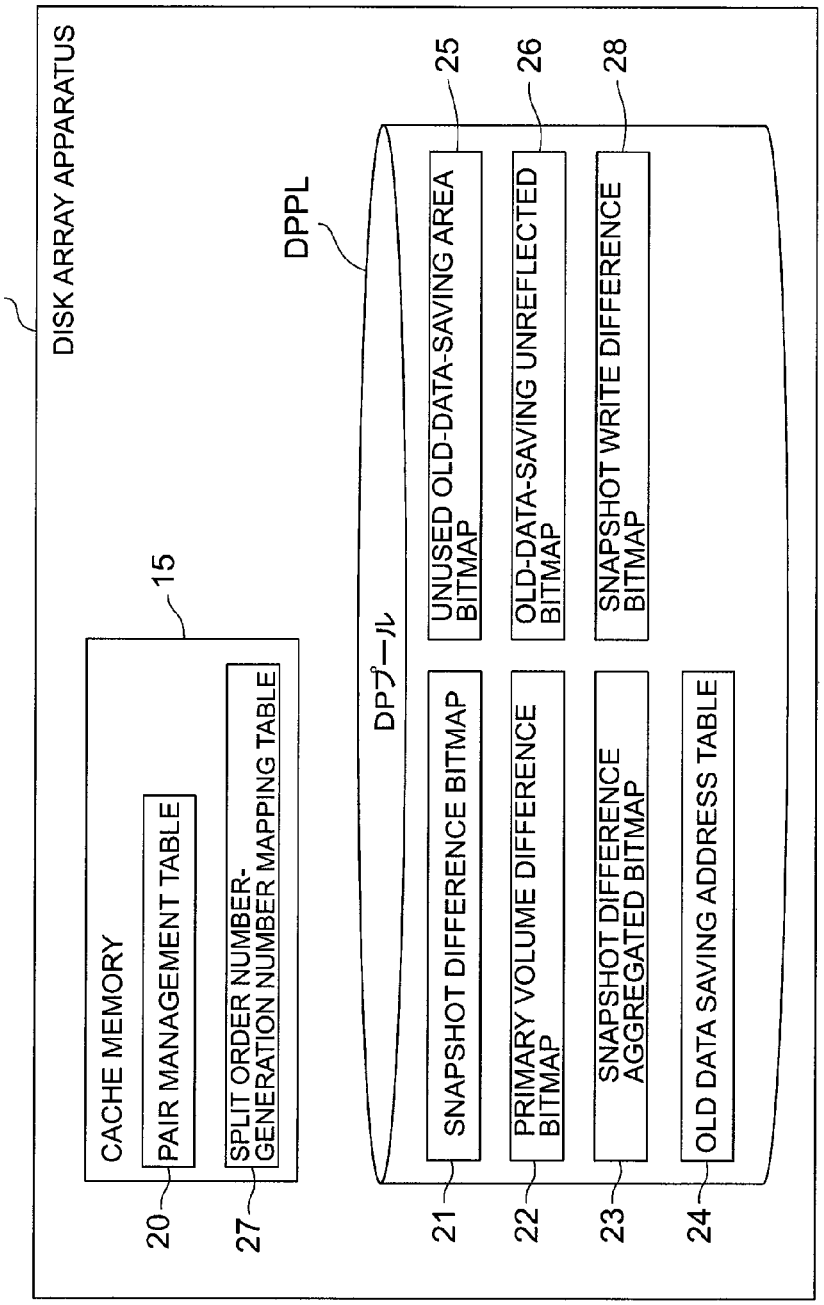
FIG. 5 is a conceptual diagram for explaining the management information.

Next, the specific content of various pieces of management information about snapshots (hereinafter referred to as the snapshot management information as necessary). Regarding the snapshot management information in the case of this disk array apparatus 4, a pair management table 20 and a split order number-generation number mapping table 27 are stored in the cache memory 15 and a snapshot difference bitmap 21, a primary volume difference bitmap 22, a snapshot difference aggregated bitmap 23, an old data saving address table 24, an unused old-data-saving area bitmap 25, an old-data-saving unreflected bitmap 26, and a snapshot write difference bitmap 28 are stored in the management information storing chunk CK1 of the data pool DP as shown in FIG. 5.

(2-3-1) Pair Management Table

The pair management table 20 is a table used to manage, for example, the pair status of each copy pair constituted from a primary volume PVOL and a snapshot volume SSVOL and is created for each primary volume PVOL.

This pair management table 20 is constituted from entries (columns) 20A as many as a maximum number of copy pairs that can be set to the same primary volume PVOL as shown in FIG. 6. The maximum number of copy pairs that can be set to the same primary volume PVOL in the case of this embodiment as mentioned above is 1024, so that the same number of entries 20A as the maximum number of copy pairs are prepared for the pair management table 20.

Each entry 20A is divided into a plurality of fields including a pair number field 20B, a pair status field 20C, an LUN field 20D, and a generation number field 20E. Then, the pair number field 20B stores an identification number assigned to the corresponding copy pair (hereinafter referred to as the pair number). The pair status field 20C stores the pair status of the relevant copy pair; and the LUN field 20D stores the LUN assigned to the snapshot volume SSVOL constituting the relevant copy pair. Furthermore, the generation number field 20E stores the generation number of a snapshot retained by the relevant snapshot volume SSVOL. Incidentally, the details of the generation number will be explained later.

So, for example, FIG. 6 shows that a copy pair whose pair number is "PN0" is constituted from a primary volume PVOL, which is associated with this pair management table 20, and a snapshot volume SSVOL to which the LUN "2" is assigned; the present pair status of the relevant copy pair is "Split"; and a snapshot whose generation number is "2" is retained by that snapshot volume SSVOL.

This pair management table 20 is updated when a new copy pair is created or when the copy pair is operated. For example, if a snapshot volume SSVOL is newly created, one entry 20A is allocated to the relevant snapshot volume SSVOL and the pair number field 20B of the relevant entry 20A stores the pair number assigned to a copy pair constituted from the relevant snapshot volume SSVOL and the primary volume PVOL. Furthermore, the pair status field 20C of the relevant entry 20A stores "Simplex" as the pair status of the relevant copy pair and the LUN field 20D of the relevant entry 20A stores the LUN of the relevant snapshot volume SSVOL. Subsequently, if a new snapshot is obtained by splitting the relevant snapshot volume SSVOL from the primary volume PVOL, the corresponding pair status field 20C in the pair management table 20 is updated from "Paired" to "Split."

(2-3-2) Snapshot Difference Bitmap

The snapshot difference bitmap 21 is a bitmap used to manage whether or not data of individual logical blocks in each snapshot has already been saved to the data pool DP; and the snapshot difference bitmap 21 is created for each primary volume PVOL. Incidentally, in the following explanation, the terms "generation" and "generation number" are used in order to distinguish individual snapshots obtained for the same primary volume PVOL. The "generation" and the "generation number" which is an identification number assigned to individual "generations," which are used in this specification, are merely numbers that start from "0" and arbitrarily assigned to the obtained snapshots; and do not represent the order in which the relevant snapshot is obtained (the order in which a snapshot volume SSVOL retaining the relevant snapshot is split from a primary volume PVOL).

The snapshot difference bitmap 21 is constituted from a first entry (column) 21A and second entries (columns) 21B as many as the number of generations for the maximum number of snapshots that can be obtained for the same primary volume PVOL as shown in FIG. 7. Since a maximum number of 1024 snapshots can be obtained for the same primary volume PVOL as mentioned above in the case of this embodiment, the same number of second entries 21B as the maximum number of the snapshots are prepared for the snapshot difference bitmap 21.

The first entry 21A is divided into a plurality of LBA fields 21AA, each of which is associated with each logical block in the primary volume PVOL. Then, each of these LBA fields 21AA sequentially stores the LBA of its corresponding logical block.

Furthermore, each second entry 21B is divided into a plurality of difference bit fields 21BA, each of which is associated with each logical block in the primary volume PVOL. Then, each difference bit field 21BA stores a difference bit that indicates whether or not data of its corresponding logical block in a snapshot of the corresponding generation has already been saved to the data pool DP.

In fact, this difference bit is set to "0" at the beginning; and when data of the corresponding logical block in the snapshot of the corresponding generation is saved to the data pool DP, the difference bit is updated to "1." Therefore, the difference bit "1" represents that the data of the corresponding logical block in the snapshot of the corresponding generation is saved to the data pool DP; and the difference bit "0" represents that the data of the corresponding logical block in the snapshot of the corresponding generation is not saved to the data pool DP.

(2-3-3) Primary Volume Difference Bitmap

The primary volume difference bitmap 22 is a bitmap used to manage whether or not data in a logical block with the same LBA in snapshots of all generations which are obtained for the same primary volume PVOL has already been saved to the data pool DP; and the primary volume difference bitmap 22 is created for each primary volume PVOL.

This primary volume difference bitmap 22 is constituted from first and second entries (columns) 22A, 22B as shown in FIG. 8. Then, the first entry 22A is divided into a plurality of LBA fields 21AA, each of which is associated with each logical block in the corresponding primary volume PVOL; and each of these LBA fields 21AA stores the LBA of its corresponding logical block.

Furthermore, the second entry 22B is divided into a plurality of difference bit fields 22BA, each of which is provided corresponding to each LBA field 21AA of the first entry. Then, each difference bit field 22BA stores a difference bit that indicates whether or not data of a logical block(s) at the corresponding LBA(s) in a snapshot(s) of all generations, which is/are obtained for the relevant primary volume PVOL, has already been saved to the data pool DP.

Specifically speaking, if the data of a logical block(s) at the corresponding LBA(s) in a snapshot(s) of all generations, which is/are obtained for the corresponding primary volume PVOL, has been saved to the data pool DP, the difference bit is set to "1"; and if the data of a logical block(s) at the corresponding logical block in a snapshot(s) of any generation has not been saved to the data pool DP, the difference bit is set to "0."

This primary volume difference bitmap 22 is designed so that when data is written to the corresponding primary volume PVOL, "1" is set to the difference bit of the difference bit field 22BA associated with a logical block in the primary volume PVOL to which the relevant data is written. This is because when data is written to the primary volume PVOL, data for snapshots of all generations, whose data has not been saved, among logical blocks to which the relevant data is written is saved; and as a results, data of the relevant logical block(s) for then obtained snapshots of all generations is saved as old data to the data pool DP as described later.

Furthermore, this primary volume difference bitmap 22 is designed so that when a snapshot of a new generation is obtained, the difference bits in all the difference bit fields 22BA are set to "0." This is because data of any logical block for a snapshot immediately after the acquisition is not saved to the data pool DP.

(2-3-4) Snapshot Difference Aggregated Bitmap

On the other hand, the snapshot difference aggregated bitmap 23 is a bitmap that aggregates information, which is represented by individual difference bits in the snapshot difference bitmap 21, for each snapshot and for each set of a specified number of logical blocks; and the snapshot difference aggregated bitmap 23 is created for each primary volume PVOL.

In fact, the snapshot difference aggregated bitmap 23 is constituted from a first entry (column) 23A and second entries (columns) 23B as many as the number of generations for a maximum number of snapshots that can be obtained for the same primary volume PVOL as shown in FIG. 9. In the case of this embodiment, the maximum number of generations for the snapshots that can be obtained for the same primary volume PVOL is 1024 as described earlier, so that the same number of second entries 23B as the maximum number of generations of snapshots are prepared for the snapshot difference aggregated bitmap 23.

The first entry 23A is divided into a plurality of aggregated LBA fields 23AA, each of which is associated with each logical block group wherein logical blocks with a specified number (16 in FIG. 9) of consecutive LBAs in the primary volume PVOL are recognized as one logical block group. Each aggregated LBA field 23AA stores the LBAs of logical blocks constituting each corresponding logical block group.

Furthermore, each second entry 23B, like the first entry 23A, is divided into a plurality of difference bit fields (hereinafter referred to as the difference aggregated bit fields) 23BA, each of which is associated with each logical block group described above. Then, each difference aggregated bit field 23BA stores a difference aggregated bit that indicates a data saving status of the corresponding logical block group for a snapshot of each corresponding generation.

Specifically speaking, when all the difference bits, each of which is associated with each logical block constituting the corresponding logical block group in the snapshot difference bitmap 21 (FIG. 7), are "0," the difference aggregated bit is set to "0"; and otherwise, the difference aggregated bit is set to "1." Furthermore, when data is written to the corresponding logical block of the corresponding primary volume PVOL or snapshot, the difference aggregated bit is changed from "0" to "1" as necessary.

This snapshot difference aggregated bitmap 23 is used to delete old data of the relevant snapshot from the data pool DP during pair deletion processing for deleting a pair of the primary volume PVOL and the snapshot volume SSVOL (that is, deleting a snapshot retained by the relevant snapshot volume SSVOL).

Specifically speaking, when deleting the old data of a deletion target snapshot from the data pool DP, it is necessary to check which logical-block old data is saved to the data pool DP. However, it would take too much time to check each logical block by using the snapshot difference bitmap 21.

So, in such a case, the snapshot difference aggregated bitmap 23 is firstly checked; regarding a logical block group whose difference aggregated bit stored in the difference aggregated bit field 23BA is "1," which logical-block old data among the logical blocks constituting the relevant logical block group is saved to the data pool DP is checked by referring to the snapshot difference bitmap 21; and regarding a logical block group whose difference aggregated bit stored in the difference aggregated bit field 23BA is "0," the snapshot difference bitmap 21 will not be checked. As a result of such processing, such pair deletion processing can be speeded up. Incidentally, the details of this pair deletion processing will be explained later (see FIG. 27A and FIG. 27B).

(2-3-5) Old Data Saving Address Table

The old data saving address table 24 is a table used to manage where in the data pool DP the data stored in individual logical blocks for a snapshot of each generation is saved; and the old data saving address table 24 is created for each primary volume PVOL.

This old data saving address table 24 is constituted from a first entry (column) 24A and second entries (columns) 24B as many as the number of generations for a maximum number of snapshots that can be obtained for the same primary volume PVOL as shown in FIG. 10. In the case of this embodiment, the maximum number of generations for the snapshots that can be obtained for the same primary volume PVOL is 1024 as described earlier, so that the same number of second entries 24B as the maximum number of generations for the snapshots are prepared for the old data saving address table 24 in advance.

The first entry 24A is divided into a plurality of LBA fields 24AA, each of which is associated with each logical block in the primary volume PVOL; and each LBA field 24AA stores the LBA of its corresponding logical block.

Furthermore, each second entry 24B is divided into a plurality of address fields 24BA, each of which is associated with each LBA field 24AA of the first entry 24A. Then, if old data of the corresponding logical block in a snapshot of each corresponding generation has already been saved to the data pool DP, each address field 24BA stores the address of the storage area SA2 (FIG. 3) in the data pool DP where the relevant data has been saved.

In fact, each address field 24BA stores an initial value ("0") at the beginning when the table is created. When writing data to the corresponding primary volume PVOL or snapshot and saving the old data, to which the data has not been written yet, to the data pool DP, the address of a save location of the relevant data in the relevant data pool DP is stored in the corresponding address field 24BA.

Reference is made to this old data saving address table 24 when a read command which designates a snapshot as a read location is issued from the host computer 3. Regarding a logical block for which the address field 24BA of the second entry 24B associated with the snapshot, which is the read location, stores the initial value, data is read from the primary volume PVOL; and regarding a logical block for which the address field 24BA stores the address in the data pool DP, data of one logical block is read from that address in the data pool DP. Then, the snapshot is restored by combining the data read from the primary volume PVOL and the data read from the data pool DP and the restored snapshot is provided to the host computer 3.

Furthermore, when writing data to a snapshot or when deleting a snapshot, the old data saving address table 24 is also used to check whether or not the data write location snapshot or the deletion target snapshot shares the data with snapshots of other generations.

Specifically speaking, if two snapshots share data, the address fields 24BA associated with the same logical block store the same address in the data pool DP. So, regarding the snapshot at the data write location, the above-described check is performed with respect to the address field 24BA associated with the logical block of the relevant snapshot at the data write location by judging whether or not the same address as the address stored in the relevant address field 24BA is stored in any of the address fields 24BA of other second entries 24B.

Then, if the same address as the address stored in the address field 24BA associated with the logical block at the data write location for the snapshot at the data write location is stored in the address field 24BA of any of other second entries 24B, this means that data of the relevant logical block for the relevant snapshot is shared with a snapshot of another generation.

Therefore, in this case, a new storage area SA2 (FIG. 3) is secured in the corresponding old data saving chunk CK2 (FIG. 3) in the data pool DP and data of the snapshot at the data write location to which the relevant data has not been written yet (old data) is saved to this storage area SA2. When this happens, the address of the above-mentioned storage area SA2 is stored in the address field 24BA associated with the logical block at the data write location in the second entry 24B associated with the snapshot at the data write location in the old data saving address table 24.

Furthermore, checking of the deletion target snapshot is performed with respect to each address field 24BA of the second entry 24B associated with the relevant snapshot in the old data saving address table 24 by judging whether or not the address stored in the relevant address field 24BA is identical to the address stored in any of other address fields 24BA in the old data saving address table 24.

Then, if the address stored in each address field 24BA corresponding to the deletion target snapshot in the old data saving address table 24 is not identical to any address stored in any of the other address fields 24BA, the relevant data is deleted; and if the address stored in each address field 24BA corresponding to the deletion target snapshot in the old data saving address table 24 is identical to the address stored in any of the other address fields 24BA, the relevant data will be left in the data pool DP without being deleted.

(2-3-6) Unused Old-Data-Saving Area Bitmap

The unused old-data-saving area bitmap 25 is a table used to manage storage areas SA2 to which the old data has not been saved (hereinafter referred to as the unused storage area) from among storage areas SA2 (FIG. 3) in the old data saving chunks CK2 (FIG. 3) defined in the data pool DP; and the unused old-data-saving area bitmap 25 is created for each data pool DP. Incidentally, there is only one data pool DP in this embodiment, so that only one unused old-data-saving area bitmap 25 is created.

Figure 11:
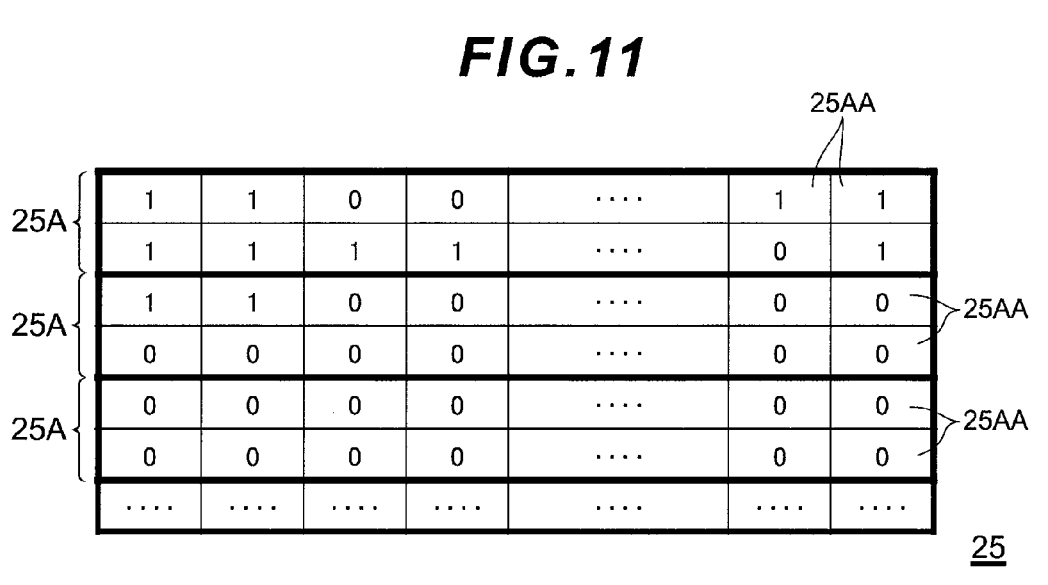

The unused old-data-saving area bitmap 25 is constituted from entries 25A as many as the number of the old data saving chunks CK2 in the data pool DP as shown in FIG. 11. Each entry 25A is associated with any of the old data saving chunks CK2 in the data pool DP and is divided into a plurality of empty bit fields 25AA, each of which is associated one-by-one each storage area SA2 in the relevant old data saving chunk CK2 in which the old data of one-logical-block size is saved.

Then, each empty bit field 25AA stores an empty bit that indicates whether the old data is saved to the corresponding storage area SA2 in the corresponding old data saving chunk CK2. Specifically speaking, if the corresponding storage area SA2 in the corresponding old data saving chunk CK2 is an unused storage area, the empty bit is set to "0"; and if the relevant storage area SA2 is not an unused storage area, the empty bit is set to "1."

When data is to be written to a primary volume PVOL or a snapshot and the old data is to be saved to the corresponding old data saving chunk CK2 in the data pool DP, this unused old-data-saving area bitmap 25 is used to search for an unused storage area SA2 in the relevant old data saving chunk CK2. Then, if data of the primary volume PVOL or the snapshot is saved to the storage area SA2 in the relevant old data saving chunk CK2, the empty bit stored in the corresponding empty bit field 25AA is updated from "0" to "1."

Furthermore, if a snapshot is deleted and the old data of the relevant snapshot is accordingly deleted from the old data saving chunk CK2 in the data pool DP, the empty bit in the corresponding empty bit field 25AA of the unused old-data-saving area bitmap 25 is updated from "1" to "0." Then, if all the empty bits stored in each empty bit field 25AA in each entry 25A in the unused old-data-saving area bitmap 25 become "0," the old data saving chunk CK2 associated with the relevant unused old-data-saving area bitmap 25 is released.

(2-3-7) Old-Data-Saving Unreflected Bitmap

If data in a logical block which has not been updated over a plurality of generations of snapshots is updated, the relevant data is saved as old data to the data pool DP as a result of the above update. In this case, the old data saved to the data pool DP will be shared between snapshots of the plurality of generations. Accordingly, it is necessary to update the management information such as the snapshot difference bitmap 21, the snapshot difference aggregated bitmap 23, and the old data saving address table 24 for the snapshots of the plurality of generations.

For example, if data stored in a logical block with the LBA "0" in the primary volume PVOL is updated in a state where snapshots of the 0th to 1023rd generations (whose generation number is from "0" to "1023") are obtained without updating the logical block with the LBA "0" as shown in FIGS. 12 (A) to (C), it is necessary, along with saving of the old data to the data pool DP, to update all different bits stored in each difference bit field 21BA associated with the relevant logical block in the snapshot difference bitmap 21 (all the difference bits surrounded by a broken line K1A), all difference aggregated bits stored in each difference aggregated bit field 23BA associated with the relevant logical block in the snapshot difference aggregated bitmap 23 (all the difference aggregated bits surrounded by a broken line K2A), and all addresses stored in each address field 24BA associated with the relevant logical block in the old data saving address table 24 (all the addresses surrounded by a broken line K3A) as shown in FIGS. 13 (A) to (C).

However, the larger the number of generations which should be updated is, the larger the load caused by such processing is. There is a possibility that the execution of such processing when writing data to the primary volume PVOL may adversely affect write performance to write data to the relevant primary volume PVOL.

So, the disk array apparatus 4 according to this embodiment is designed so that when writing data to the primary volume PVOL, only the management information of a snapshot of the latest generation is updated among snapshots of a plurality of generations which share the old data. Then, the management information of snapshots of the remaining generations is updated when any of the remaining snapshots is accessed (read-accessed or write-accessed) or when any of the remaining snapshots is deleted (a copy pair of a snapshot volume SSVOL retaining that snapshot and the primary volume PVOL).

Figure 14:
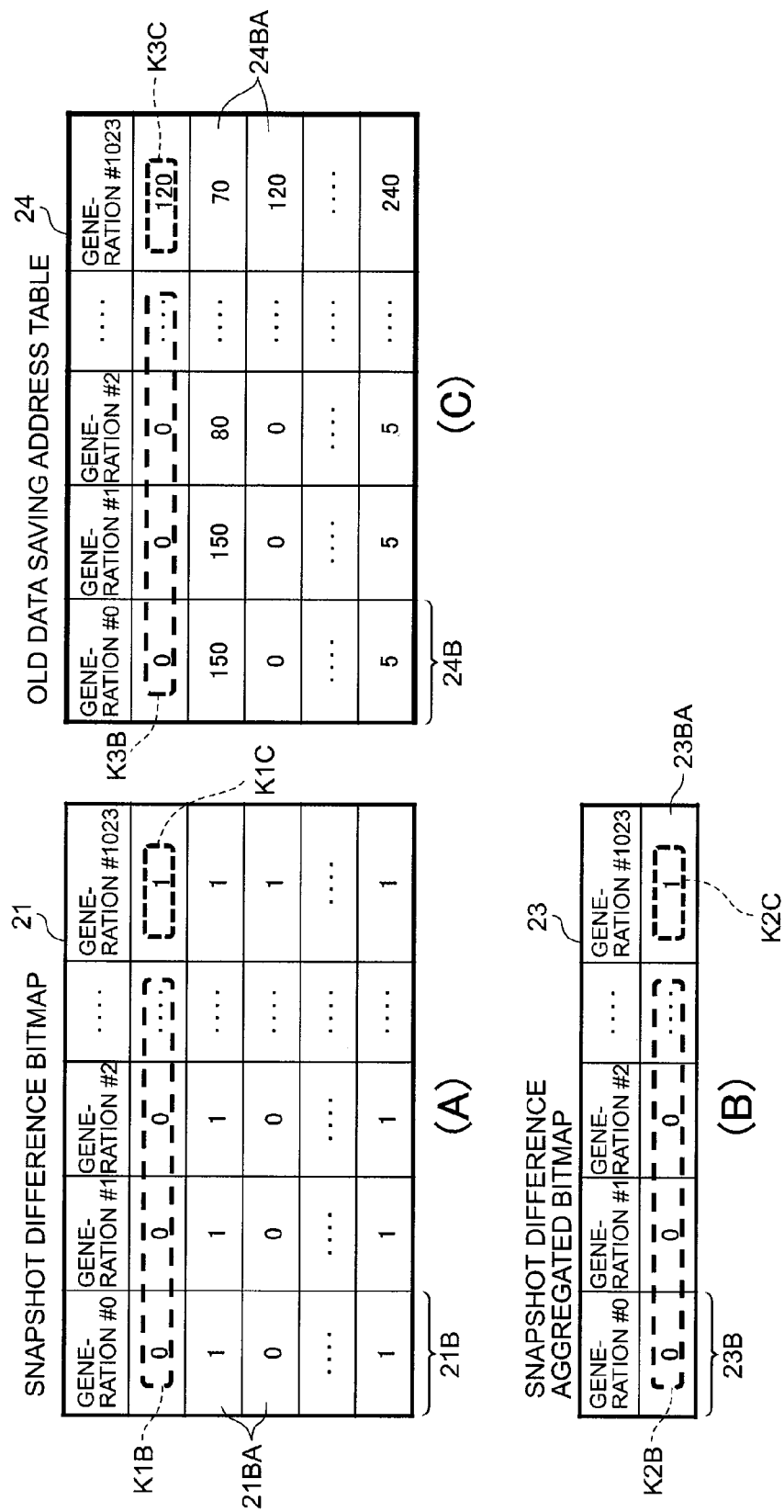
FIGS. 14 (A) to (C) are conceptual diagrams for explaining the old-data-saving unreflected bitmap.

For example, in the case explained above with reference to FIGS. 12 (A) to (C), when writing data to the primary volume PVOL, only the management information about a snapshot of the 1023rd generation which is the latest generation (the generation number is "1023") (the management information surrounded by broken lines K1C to K3C) is updated, among the snapshots of a plurality of generations which share the old data, as shown in FIGS. 14 (A) to (C). Then, the management information of snapshots of the remaining generations (the management information surrounded by broken lines K1B to K3B) is updated when any of the remaining snapshots is read-accessed or write-accessed or when any of the remaining snapshots is deleted.

With this disk array apparatus 4 as described above, degradation of the write performance to write data to the primary volume PVOL due to the above-described management information update processing is effectively prevented by transferring the processing load imposed when writing data to the primary volume PVOL, which frequently occurs, to the time of access to snapshots which does not frequently occur.

With this disk array apparatus 4, whether the management information of snapshots of generations other than the latest generation, among snapshots of a plurality of generations which share the old data, has been updated or not is managed by using the old-data-saving unreflected bitmap 26 in order to execute the above-described operation. This old-data-saving unreflected bitmap 26 is created for each primary volume PVOL.

The old-data-saving unreflected bitmap 26 is constituted from first and second entries (columns) 26A, 26B as shown in FIG. 15. Then, the first entry 26A is divided into a plurality of LBA fields 26AA, each of which is associated with each logical block in the primary volume PVOL; and each LBA field 26AA stores the LBA of the corresponding logical block.

Furthermore, the second entry 26B includes a plurality of unreflected bit fields 26BA, each of which is associated with each logical block of the corresponding primary volume PVOL. Then, when data is written to the primary volume PVOL and reflected in the latest generation snapshot, the unreflected bit field 26BA stores an unreflected bit that indicates whether the management information of all snapshots of a generation other than the latest generation have been updated or not.

Specifically speaking, when data is written to the primary volume PVOL, and reflected in the latest generation snapshot, and the old data in the corresponding logical block is thereby saved to the data pool DP, the unreflected bit is updated from the initial value "0" to "1"; and when the management information of all snapshots of a generation other than the latest generation are then updated, the unreflected bit is returned to "0"

In other words, the unreflected bit "1" represents that the management information of a snapshot of a generation other than the latest generation has not been updated; and the unreflected bit "0" represents that the management information of a snapshot of a generation other than the latest generation has been updated.

Incidentally, which generation is the latest generation among the generations of the snapshots sharing the old data saved to the data pool DP is judged based on the split order number-generation number mapping table 27 explained below.

(2-3-8) Split Order Number-Generation Number Mapping Table

This disk array apparatus 4 is designed as explained with reference to FIG. 12 to FIG. 15 so that when data is written to the primary volume PVOL, only the management information of a snapshot of the latest generation among the snapshots of a plurality of generations which share the old data is updated; and the management information of snapshots of the remaining generations is updated when any of the remaining snapshots is read-accessed or write-accessed or when any of the remaining snapshots is deleted.

Figure 16:
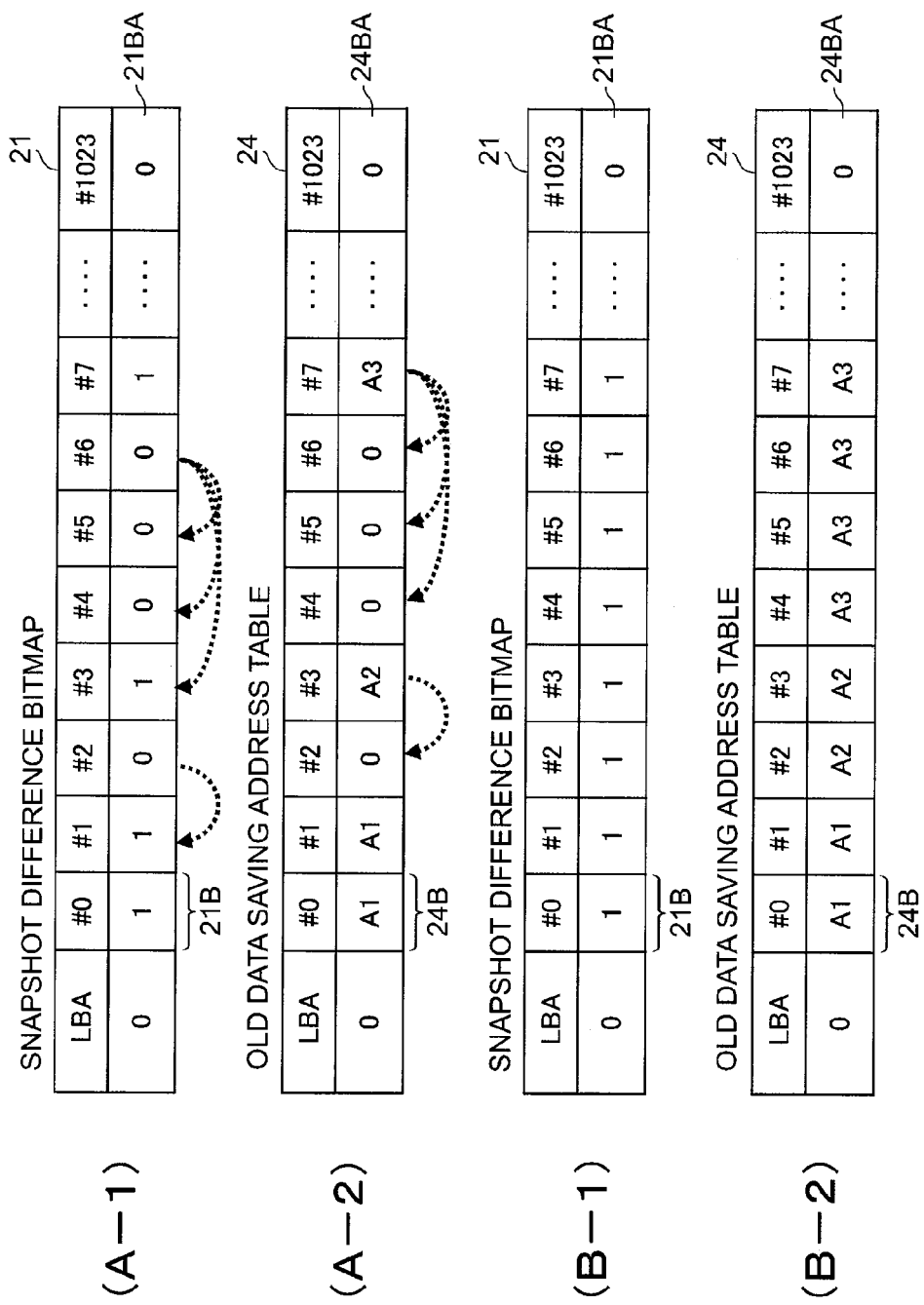
FIGS. 16 (A-1) to (B-2) are conceptual diagrams for explaining a split order number-generation number mapping table.

FIG. 16 (A-1) shows a state example of the snapshot difference bitmap 21 in this disk array apparatus 4 having the above-described function and FIG. 16 (A-2) shows a state example of the old data saving address table 24 at the same point in time as FIG. 16 (A-1). Both FIGS. 16 (A-1) and (A-2) show that only a part corresponding to the logical block with the LBA "0" in the snapshot difference bitmap 21 and the old data saving address table 24 is extracted. Furthermore, "A1" to "A3" in FIG. 16 (A-2) indicate the addresses in the data pool DP. The same applies to FIGS. 16 (B-1) and (B-2) explained later.

FIG. 16 (A-1) shows that since the data of the logical block with the LBA "0" in the primary volume PVOL is updated after obtaining a snapshot of the third generation (the generation number is "3") and before obtaining a snapshot of the fourth generation (the generation number is "4"), the difference bit associated with the logical block with the LBA "0" in the snapshot difference bitmap 21 is updated to "1" as the latest generation at the time of data writing. FIG. 16 (A-1) also shows that under the above-described circumstance, the management information of a snapshot of the second generation (the generation number is "2") is not updated and the difference bit associated with the logical block with the LBA "0" remains to be "0."

Furthermore, FIG. 16 (A-1) shows that subsequently, the data of the logical block with the LBA "0" in the primary volume PVOL is not updated until a snapshot of the seventh generation (the generation number is "7") is obtained; and since the data of the logical block with the LBA "0" is updated after obtaining the snapshot of the seventh generation, the difference bit associated with the relevant logical block in the snapshot difference bitmap 21 is updated to "1" as the latest generation at the time of data writing. FIG. 16 (A-1) also shows that under the above-described circumstance, the management information of snapshots of the fourth to sixth generations (the generation number is from "4" to "6") is not updated and any of the difference bits of the fourth to sixth generations associated with the relevant logical block remains to be "0."

For example, when control is performed to assign a smaller generation number to a snapshot which is obtained earlier in the acquisition order in the above-described case, during subsequent execution of processing for having the management information of the snapshot of the "latest generation" reflected in the management information of the snapshots of the "remaining generations" (hereinafter referred to as the difference reflecting processing), the management information of the snapshot of the third generation may be reflected in the snapshot of the second generation and the management information of the snapshot of the seventh generation may be reflected in the snapshots of the fourth to sixth generations.

Specifically speaking, regarding the snapshot of the second generation, the difference bit in the difference bit field 21BA associated with the relevant logical block in the entry 21B associated with the snapshot of the second generation among the entries in the snapshot difference bitmap 21 is updated to "1" as shown in FIG. 16 (B-1). Furthermore, as shown in FIG. 16 (B-2), the address stored in the address field 24BA associated with the logical block with the LBA "0" in the primary volume PVOL in the entry 24B associated with the snapshot of the third generation among the entries 24B in the old data saving address table 24 is copied to the address field 24BA associated with the relevant logical block in the entry 24B associated with the snapshot of the second generation. Furthermore, the difference aggregated bit stored in the difference aggregated bit field 23BA (FIG. 3) associated with the relevant logical block in the entry 23B associated with the snapshot of the second generation among the entries 23B (FIG. 9) in the snapshot difference aggregated bitmap 23 (FIG. 9) is also updated as necessary.

Similarly, regarding the snapshots of the fourth to sixth generations, each difference bit in the difference bit field 21BA associated with the relevant block in each entry 21B associated with each snapshot of the fourth to sixth generations among the entries 21B in the snapshot difference bitmap 21 is updated to "1" as shown in FIG. 16 (B-1). Furthermore, as shown in FIG. 16 (B-2), the address stored in the address field 24BA associated with the logical block with the LBA "0" in the primary volume PVOL in the entry 24B associated with the snapshot of the seventh generation among the entries 24B in the old data saving address table 24 is copied to each address field 24BA associated with the relevant logical block in each entry 24B associated with each snapshot of the fourth to sixth generations. Furthermore, the difference aggregated bit stored in the difference aggregated bit field 23BA associated with the relevant logical block in each entry 23B associated with the snapshots of the fourth to sixth generations among the entries 23B (FIG. 9) in the snapshot difference aggregated bitmap 23 (FIG. 9) is also updated as necessary.

Subsequently, the unreflected bit stored in the unreflected bit field 26BA (FIG. 15), which is associated with the snapshots of the second generation and the fourth to sixth generations associated with the relevant logical block in the primary volume PVOL, in the old-data-saving unreflected bitmap 26 (FIG. 15) is updated from "1" to "0."

As a result of the above-described difference reflecting processing, the management information of the snapshot of the third generation can be reflected in the management information of the snapshot of the second generation and the management information of the snapshot of the seventh generation can be reflected in the management information of the snapshots of the fourth to sixth generations.

However, in the case of this disk array apparatus 4, the generation number is a number arbitrarily assigned to the relevant snapshot when the snapshot is obtained by splitting the snapshot volume SSVOL from the primary volume PVOL as described later; and the generation number does not indicate the order in which the relevant snapshot was obtained.

Therefore, if the snapshot of the second generation was obtained after the snapshot of the third generation was obtained in the example shown in FIGS. 16 (A-1) to (B-2) and then the above-described difference reflecting processing is executed, the management information of the snapshot obtained earlier would be reflected in the management information of the snapshot obtained later, which will cause a trouble.

So, this disk array apparatus 4 manages the relationship between the order, in which a snapshot is obtained by splitting the snapshot volume SSVOL retaining the snapshot from the primary volume, and the generation number assigned to the relevant snapshot by using the split order number-generation number mapping table 27. This split order number-generation number mapping table 27 is created for each primary volume PVOL.

The split order number-generation number mapping table 27 is constituted from first and second entries (columns) 27A, 27B as shown in FIG. 17. The first entry 27A is divided into split order number fields 27AA as many as a maximum number of copy pairs that can be set to the same primary volume PVOL; and each split order number field 27AA stores a split order number. Incidentally, the split order number is stored in the split order number field 27AA in a manner such that a numerical value of the split order number in the split order number field 27AA increases one by one as the position in the table moves to the right, for example, "0" is stored in the split order number field 27AA at the left end, "1" is stored in the next split order number field 27AA to the right of the left-end split order number field 27AA, and "2" is stored in the second next split order number field 27AA to the right of the left-end split order number field 27AA.

Furthermore, the second entry 27B is divided into a plurality of generation number fields 27B, each of which corresponds to the above-described split order number field 27AA; and each generation number field 27B stores the generation number of the corresponding snapshot. Incidentally, the "generation number of the corresponding snapshot" herein used means a snapshot retained by a snapshot volume SSVOL whose order of split from the relevant primary volume PVOL is identical to the split order number stored in the corresponding split order number field 27AA, among snapshot volumes SSVOL which are set to constitute copy pairs with the same primary volume PVOL.

This split order number-generation number mapping table 27 is used to: firstly detect a snapshot of the latest generation when data is written to the primary volume PVOL; and secondly detect the split order number, indicating the order in which the snapshot volume SSVOL is split from the primary volume PVOL, when the aforementioned difference reflecting processing is executed.

Figure 18:
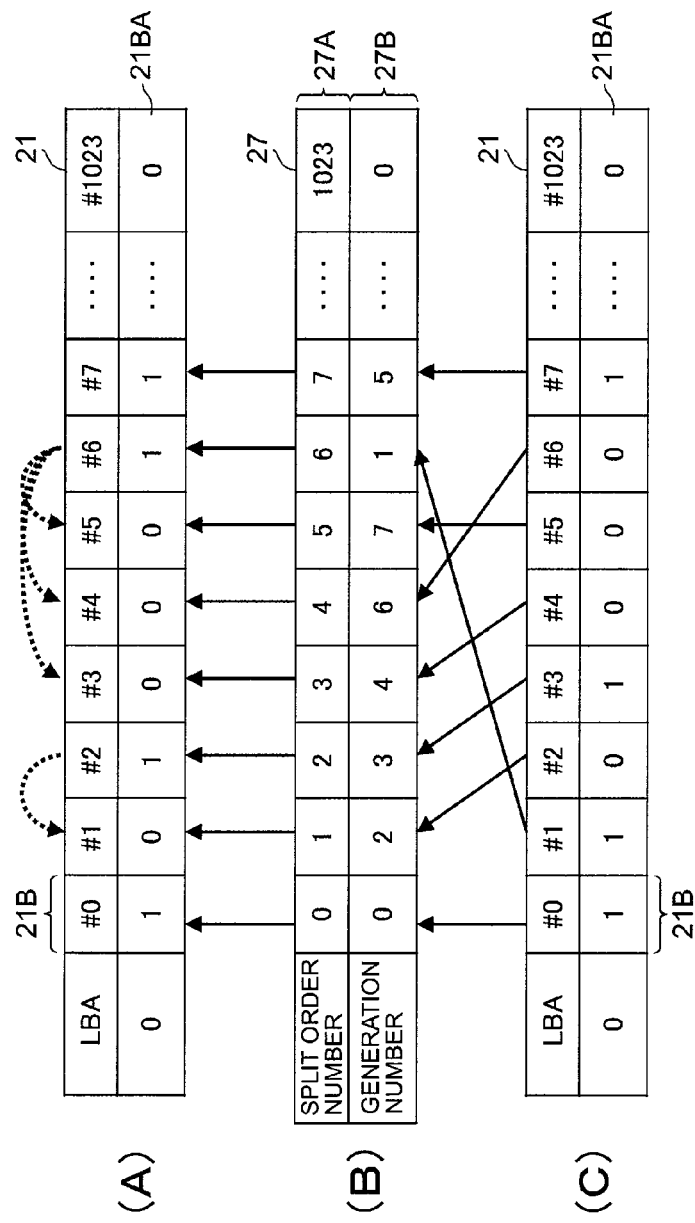
FIGS. 18 (A) to (C) are conceptual diagrams for explaining a snapshot write difference bitmap.
Figure 19:
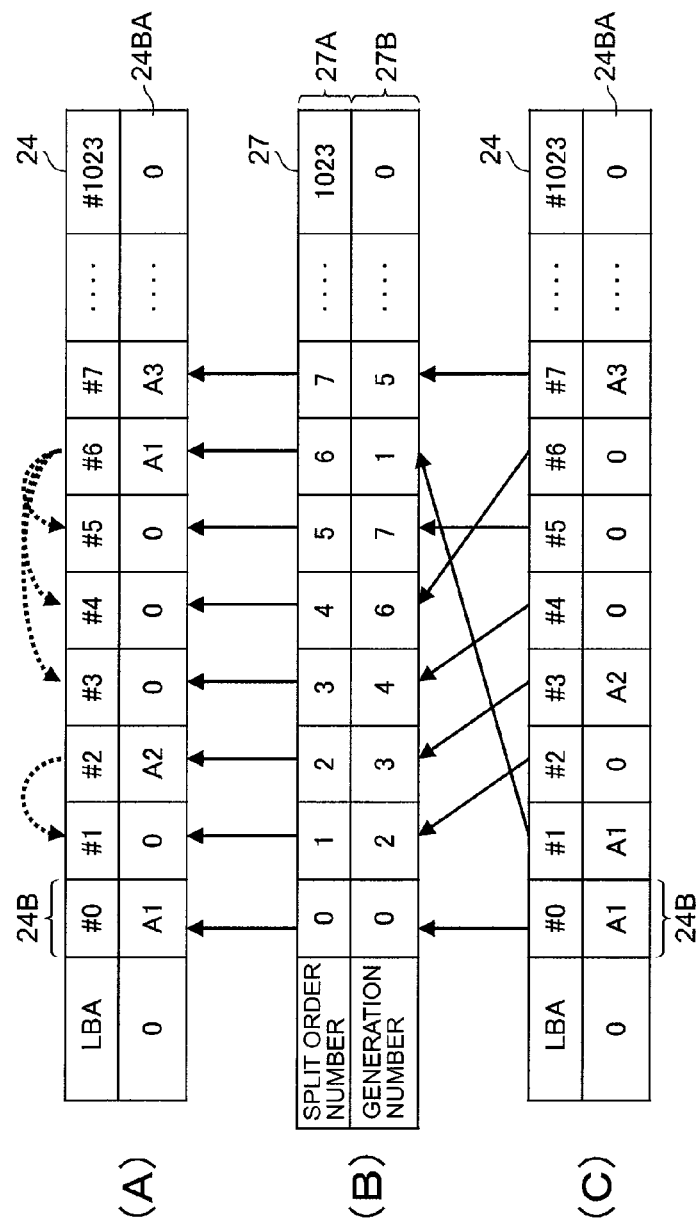
FIGS. 19 (A) to (C) are conceptual diagrams for explaining the snapshot write difference bitmap.

Specifically speaking, for example, if the snapshot difference bitmap 21 is in a state shown in FIG. 18 (C) and the split order number-generation number mapping table 27 is in a state shown in FIG. 18 (B), the disk array apparatus 4 rearranges the alignment sequence of the respective snapshots and their corresponding entries 21B in the snapshot difference bitmap 21 to the snapshot acquisition order as shown in FIG. 18 (A) by using the split order number-generation number mapping table 27. Similarly, if the old data saving address table 24 at that time is in a state shown in FIG. 19 (C), the disk array apparatus 4 rearranges the alignment sequence of the respective snapshots and their corresponding entries 21B in the old data saving address table 24 to the acquisition order as shown in FIG. 19 (A) by using the split order number-generation number mapping table 27 (FIG. 19 (B)).

For example, in the example of FIG. 18 (C) with reference to FIG. 18 (B), it is shown that a snapshot of the $0^{th}$ generation (the generation number is "0") is a snapshot retained by the snapshot volume SSVOL whose split order number is "0"; and subsequently, snapshots of the second generation, the third generation, the fourth generation, the sixth generation, the seventh generation, the first generation, and the fifth generation are obtained in the order listed above. So, when the difference reflecting processing is executed, each entry 21B in the snapshot difference bitmap 21 is rearranged as shown in FIG. 18 (A) so that each snapshot and its corresponding entry 21B is aligned in the order of the generation number; and each entry 24B in the old data saving address table 24 is rearranged as shown in FIG. 18 (A) so that each snapshot and its corresponding entry 24B is aligned in the order of the generation number.

Then, during the difference reflecting processing, attention is firstly focused on one logical block of the primary volume PVOL and the difference bit "0" located between the difference bits "1" is detected among the difference bits associated with the relevant logical block of each entry 21B by using the snapshot difference bitmap 21 in which the alignment sequence of the entries 21A, 24B is rearranged to the split order (snapshot acquisition order) of the corresponding snapshot volume SSVOL as described above.

For example, in the example of FIG. 18 (A), the difference bit associated with a snapshot retained by the snapshot volume SSVOL whose split order number is "1" (snapshot of the second generation), and the difference bits respectively associated with snapshots retained by the snapshot volumes SSVOL whose split order number is "3" to "5" (snapshots of the fourth generation, the sixth generation, and the seventh generation) are the difference bits to be detected among the difference bits of the respective entries 21B associated with the logical block with the LBA "0".

Then, the difference reflecting processing is executed so that with respect to each snapshot associated with the difference bit whose value detected as described above is "0" (hereinafter referred to as the unreflected snapshot), a snapshot which is obtained earliest after the acquisition of the unreflected snapshot and for which the value of the difference bit associated with the relevant logical block is "1" is detected and the management information about the relevant logical block among the management information of the relevant snapshot is reflected in the management information about the relevant logical block among the management information of the corresponding unreflected snapshot.

For example, in the examples shown in FIG. 18 and FIG. 19, assuming that attention is focused on the logical block whose LBA is "0" in the primary volume PVOL, with respect to a snapshot retained by the snapshot volume SSVOL whose split order number is "1" (snapshot of the second generation), a snapshot which is obtained earliest after the acquisition of the relevant snapshot and for which the value of the difference bit associated with the relevant logical block is "1" is a snapshot which is retained by the snapshot volume SSVOL with the split order number "2" and whose generation number is "3" (snapshot of the third generation). Therefore, in this case, the management information about the relevant logical block among the management information of the snapshot of the third generation is reflected in the management information about the relevant logical block among the management information of the snapshot of the second generation.

Specifically speaking, the address stored in the address field 24BA associated with the relevant logical block in the entry 24B associated with the snapshot of the third generation, among the entries 24B in the old data saving address table 24 shown in FIG. 19 (A), is copied to the address field 24BA associated with the relevant logical block in the entry 24B associated with the snapshot of the second generation among the entries 24B in the relevant old data saving address table 24. Furthermore, the difference bit stored in the difference bit field 21BA associated with the relevant logical block in the entry 21B associated with the snapshot of the second generation, among the entries in the snapshot difference bitmap 21 shown in FIG. 18 (A), is updated to "1."

Similarly, with respect to the snapshots of the fourth generation, the sixth generation, and the seventh generation, which are retained by the snapshot volumes SSVOL with split order number "3" to "5," a snapshot which is obtained earliest after the acquisition of these snapshots and for which the value of the difference bit associated with the relevant logical block is "1" is a snapshot of the first generation retained by the snapshot volume SSVOL whose split order number is "6." Therefore, in this case, the management information about the relevant logical block among the management information of the snapshot of the first generation is reflected in the management information about the relevant logical block among the management information of the snapshots of the fourth generation, the sixth generation, and the seventh generation retained by the snapshot volumes SSVOL whose split order number is "3" to "5."

Specifically speaking, the address stored in the address field 24BA associated with the relevant logical block in the entry 24B associated with the snapshot of the first generation, among the entries 24B in the old data saving address table 24 shown in FIG. 19 (A), is copied to the address field 24BA associated with the relevant logical block in each entry 24B associated with each of the snapshots of the fourth generation, the sixth generation, and the seventh generation retained by the snapshot volumes SSVOL whose split order number is "3" to "5," among the entries 24B in the relevant old data saving address table 24. Furthermore, among the entries 21B in the snapshot difference bitmap 21 shown in FIG. 18 (A), the difference bit stored in the difference bit field 21BA associated with the relevant logical block in each entry 21B associated with each of the snapshots of the fourth generation, the sixth generation, and the seventh generation is updated to "1."

Subsequently, the unreflected bit stored in the unreflected bit field 26BA associated with the relevant logical block, among the unreflected bit fields 26BA (FIG. 15) in the old-data-saving unreflected bitmap 26 (FIG. 15), is changed from "1" to "0."

Furthermore, during the difference reflecting processing, the above-described processing is executed on all logical blocks of the primary volume PVOL. As a result of such processing, the management information of the corresponding snapshot is reflected in the management information of the unreflected snapshot with respect to each unreflected snapshot.

(2-3-9) Snapshot Write Difference Bitmap

During the difference reflecting processing as described above, the generation(s) in which the management information of the snapshot(s) later obtained should be reflected is judged by using the snapshot difference bitmap 21 and the split order number-generation number mapping table 27.

Meanwhile, if data is written to a snapshot of a generation, on which the difference reflecting processing has not been executed, before execution of such difference reflecting processing (hereinafter referred to as the unreflected generation), the difference bit associated with the logical block, on which the relevant data writing has been performed, is updated to "1" among the entries 21B associated with the snapshot of the unreflected generation, on which the relevant data writing has been performed, in the snapshot difference bitmap 21. However, if such processing is executed, the problem is that the difference reflecting processing to be executed later may not be properly executed.

For example, the following explanation will be given, assuming that data is written to the address "0" of a snapshot of the fifth generation when the order of split of the snapshot volumes SSVOL from the primary volumes PVOL is identical to the generation number of snapshots retained by those snapshot volume SSVOL, and the snapshot difference bitmap 21 is in a state shown in FIG. 20 (A-1), and the old data saving address table 24 is in a state shown in FIG. 20 (A-2).

Figure 20:
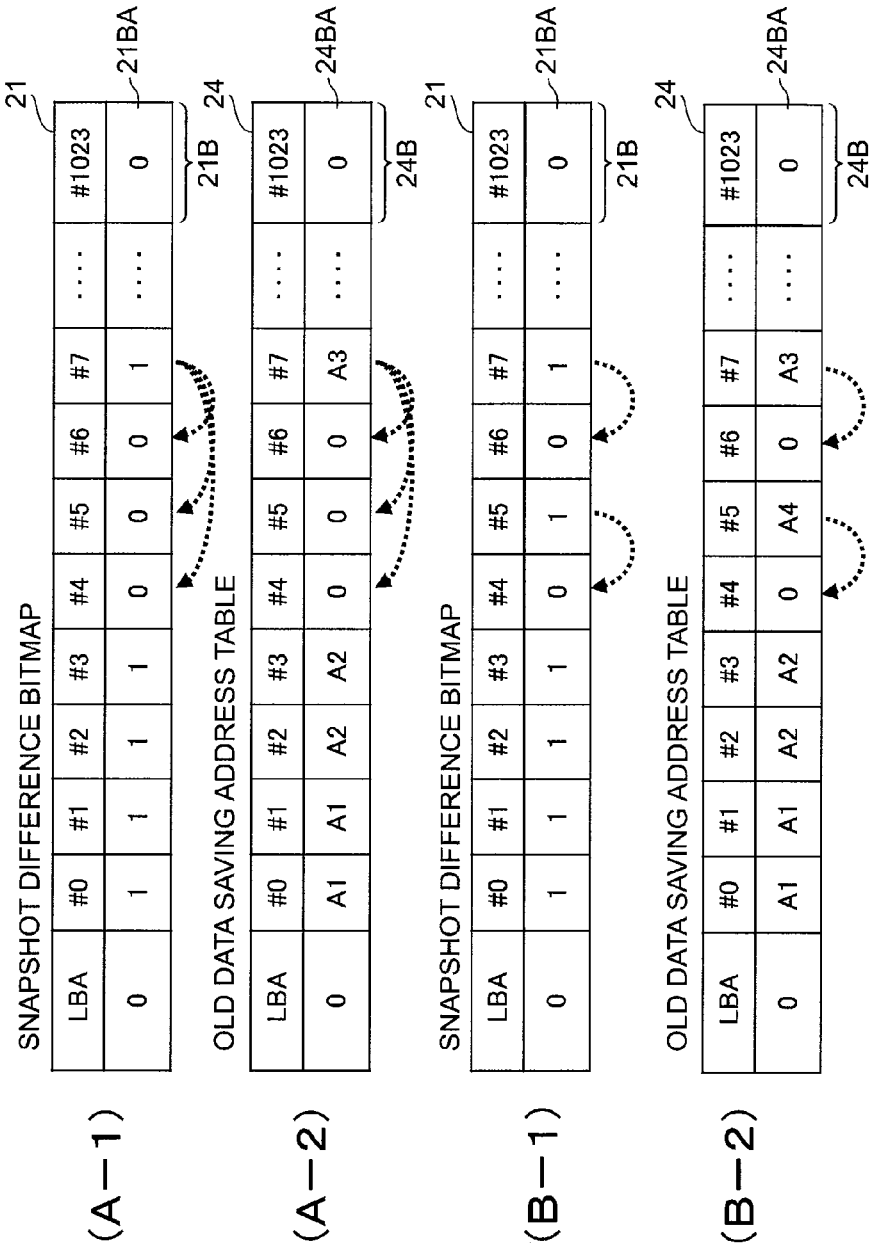
FIGS. 20 (A-1) to (B-2) are conceptual diagrams for explaining the snapshot write difference bitmap.

In this case, with regard to the snapshot difference bitmap 21, the difference bit stored in the difference bit field 21BA corresponding to the logical block with the LBA "0" in the entry 21B corresponding to the fifth generation is updated to "1" as shown in FIG. 20 (B-1); and the address in the data pool DP where data of the logical block "0," regarding which data was written to the snapshot of the fifth generation, has been saved ("A4" in FIG. 20 (B-2) is stored in the old data saving address table 24 as shown in FIG. 20 (B-2).

Subsequently, when the difference reflecting processing is executed, the management information of the snapshot of the seventh generation is reflected in the management information of the snapshot of the sixth generation and the management information of the snapshot of the fifth generation is reflected in the management information of the snapshot of the fourth generation as shown with broken line arrows in FIGS. 20 (B-1) and (B-2). Specifically speaking, the management information of the snapshot of the fourth generation should be updated essentially based on the management information of the snapshot of the seventh generation, but not the snapshot of the fifth generation, as indicated with broken line arrows in FIGS. 20 (A-1) and (A-2); however, because data has been written to the snapshot of the fifth generation, the difference reflecting processing will not be properly executed on the snapshot of the fourth generation.

So, this disk array apparatus 4 manages whether data has been written to snapshots or not, by using the snapshot write difference bitmap 28.

Figures 21, 22:
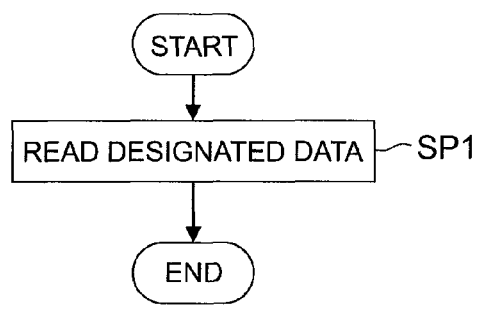
FIG. 21 is a conceptual diagram showing the structure of the snapshot write difference bitmap.
FIG. 22 is a flowchart illustrating a processing sequence for read processing.

The snapshot write difference bitmap 28 is a bitmap created for each primary volume PVOL and is constituted from a first entry (column) 28A and second entries (column) 28B as many as the number of generations of a maximum number of snapshots that can be obtained for the same primary volume PVOL, as shown in FIG. 21. In the case of this embodiment, the maximum number of generations of snapshots that can be obtained for the same primary volume PVOL is 1024 as described earlier, so that the same number of second entries 28B as the maximum number of generations of snapshots are prepared for the snapshot write difference bitmap 28 in advance.

The first entry 28A is divided into a plurality of LBA fields 28AA, each of which is associated with each logical block in the primary volume PVOL. Then, each LBA field 28AA stores the LBA of the corresponding logical block.

Furthermore, each second entry 28B is divided into a plurality of write difference bit fields 28BA, each of which is associated with each logical block in the primary volume PVOL. Then, each write difference bit field 28BA stores a write difference bit that indicates whether data has been written to data in the corresponding logical block of a snapshot of the corresponding generation.

In fact, the write difference bit is set to "0" at the beginning; and when data is written to the corresponding logical block of a snapshot of the corresponding generation, the write difference bit is updated to "1." Therefore, the write difference bit "0" represents that data writing to the corresponding logical block of a snapshot of the corresponding generation has not occurred (data stored in the relevant logical block has not been saved to the data pool DP, excluding a case where data is written to the logical block of the corresponding primary volume PVOL); and the write difference bit "1" represents that data writing to the corresponding logical block of a snapshot of the corresponding generation has occurred (data stored in the relevant logical block has been saved to the data pool DP).

(2-4) Processing Sequence for Various Processing

Next, the specific processing content of various processing executed by the CPU 17 (FIG. 1) for the disk array apparatus 4 in relation to the snapshot function mounted in this disk array apparatus 4. Incidentally, the CPU 17 executes the following various processing based on a control program (not shown in the drawings) stored in the local memory 16 (FIG. 1).

(2-4-1) Read Processing

FIG. 22 shows a processing sequence for read processing executed by the CPU 17 when the disk array apparatus 4 receives a read command which is sent from the host computer 3 and whose target is the primary volume PVOL.

After receiving the relevant read command, the CPU 17 starts the read processing shown in FIG. 22 and reads data from a logical block designated by the relevant read command in a primary volume PVOL designated by the relevant read command by controlling the back-end interface 14 (FIG. 1) based on the relevant read command. The CPU 17 also transfers the read data via the cache memory 15 to the host computer 3 which is an issuer of the relevant read command (SP1). Then, the CPU 17 terminates this read processing.

(2-4-2) Write Processing

Figure 23:
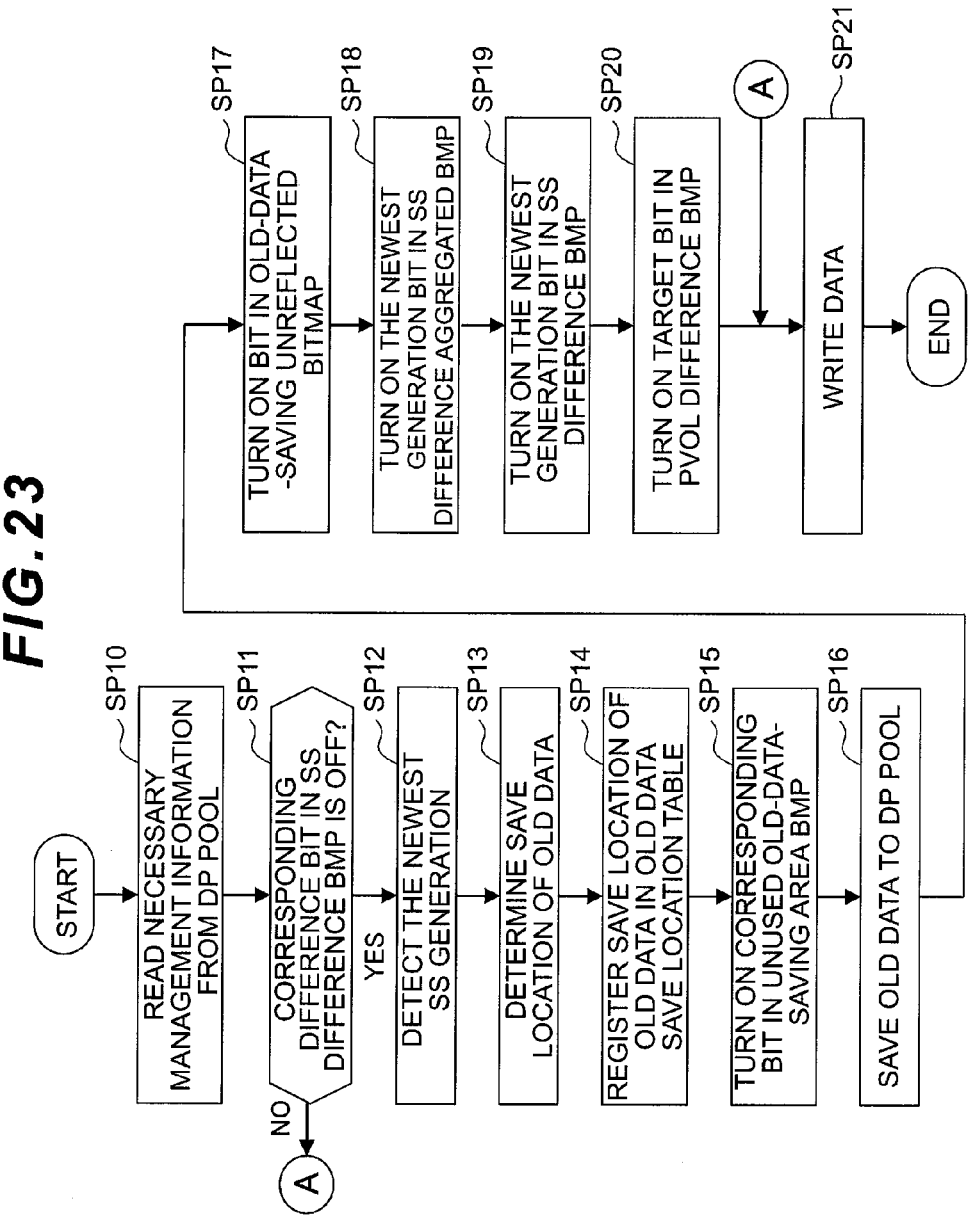
FIG. 23 is a flowchart illustrating a processing sequence for write processing.

FIG. 23 shows a processing sequence for write processing executed by the CPU 17 when the disk array apparatus 34 receives a write command which is sent from the host computer 3 and whose target is the primary volume PVOL.

After receiving the relevant write command, the CPU 17 starts the write processing shown in FIG. 23; and firstly reads part of the management information that is necessary for the processing, among the snapshot management information stored in the data pool DP (the snapshot difference bitmap 21, the primary volume difference bitmap 22, the snapshot difference aggregated bitmap 23, the old data saving address table 24, the unused old-data-saving area bitmap 25, the old-data-saving unreflected bitmap 26, and the snapshot write difference bitmap 28), via the back-end interface 14 to the cache memory 15 (SP10). Therefore, for example, when thereafter referring to or updating these pieces of management information during to the write processing, reference is made to the management information read to the cache memory 15 or such management information read to the cache memory 15 is updated.

Subsequently, the CPU 17 refers to the corresponding primary volume difference bitmap 22 (FIG. 8) corresponding to the primary volume PVOL at a data write location and judges whether or not data stored in a logical block designated by the relevant write command as the data write location (hereinafter referred to as the write-location logical block) in the primary volume PVOL designated by the relevant write command as the data write location (hereinafter referred to as the write-location primary volume) has been saved to the data pool DP (SP11). This judgment is performed by judging whether the difference bit associated with the write-location logical block in the relevant primary volume difference bitmap 22 is "0" or not.

If the CPU 17 obtains a negative judgment result in this step, the processing proceeds to step SP20. On the other hand, if the CPU 17 obtains an affirmative judgment result in this step, it refers to the snapshot difference bitmap 21 (FIG. 7), the split order number-generation number mapping table 27 (FIG. 17), and the snapshot write difference bitmap 28 (FIG. 21) and searches for the generation number of the latest generation among the generations of snapshots for which data of the relevant write-location logical block has not been saved (SP12).

Next, the CPU 17 refers to the unused old-data-saving area bitmap 25 (FIG. 11) and determines a save location of the data stored in the relevant write-location logical block (SP13). Specifically speaking, the CPU 17 judges whether or not any unused storage area SA2 (FIG. 3) of a sufficient size to save the data in the relevant write-location logical block (old data) exists in the old data saving chunk CK2 (FIG. 3) associated with the write-location primary volume PVOL in the data pool DP. If the CPU 17 determines that such an unused storage area exists, it secures the storage area SA2 of a sufficient size to save the relevant data in the relevant old data saving chunk CK2 and determines the secured storage area SA2 as the save location of the relevant data. Furthermore, if the CPU 17 determines that such an unused storage area does not exist in the old data saving chunk CK2 associated with the write-location primary volume PVOL in the data pool DP, it creates a new old data saving chunk CK2 associated with the relevant write-location primary volume PVOL in the data pool DP, secures a storage area SA2 of a size capable of saving the data of the relevant write-location logical block in the relevant old data saving chunk CK2, and determines the secured storage area SA2 as the save location of the relevant data.

Furthermore, the CPU 17 registers the save location of the data (old data), which is stored in the write-location logical block in the write-location primary volume PVOL, in the old data saving address table 24 (FIG. 10) (SP14). Specifically speaking, the CPU 17 stores the address of the storage area SA2 in the data pool DP, which was determined as the save location of the data in step SP13, in the address field 24BA associated with the write-location logical block in the second entry 24B associated with the snapshot of the latest generation detected in step SP12 among the second entries 24B (FIG. 10) in the old data saving address table 24.

Furthermore, the CPU 17 changes the empty bit, which is stored in the empty bit field 25AA corresponding to the storage area SA2 determined as the save location of the data in step SP13 among the empty bit fields 25AA (FIG. 11) in the unused old-data-saving area bitmap 25 (FIG. 11), from "0" to "1" (SP15); and then save the data (old data), which is stored in the write-location logical block of the write-location primary volume PVOL, to the storage area SA1 determined in step SP13 in the data pool DP (SP16).

Next, the CPU 17 changes the unreflected bit, which is stored in the unreflected bit field 26BA in the old-data-saving unreflected bitmap 26 (FIG. 15) corresponding to the write-location logical block in the write-location primary volume PVOL, from "0" to "1" (SP17). The CPU 17 also changes the difference aggregated bit, which is stored in the difference aggregated bit field 23BA associated with the write-location logical block for which the data was saved in step SP16, among the difference aggregated bit fields 23BA in the snapshot difference aggregated bitmap 23 (FIG. 9), from "0" to "1" (SP18).

Then, the CPU 17 updates the difference bit, which is stored in the difference bit field 21BA corresponding to the write-location logical block (for which the data was saved in step SP16) (the difference bit field 21BA corresponding to the write-location logical block in the first entry 21B corresponding to the snapshot of the latest generation), among the difference bit fields 21BA (FIG. 7) in the snapshot difference bitmap 21 (FIG. 7), from "0" to "1" (SP19). The CPU 17 also updates the difference bit, which is stored in the difference bit field 22BA corresponding to the relevant write-location logical block, among the difference bit fields 22BA (FIG. 8) in the primary volume difference bitmap 22 (FIG. 8), from "0" to "1" (SP20).

Subsequently, the CPU 17 writes the write data, which was sent together with the write command from the host computer 3, via the cache memory 15 (FIG. 1) to the write-location logical block in the write-location primary volume PVOL (SP21). The CPU 17 then terminates this write processing.

(2-4-3) First Snapshot Read Processing

Figure 24:
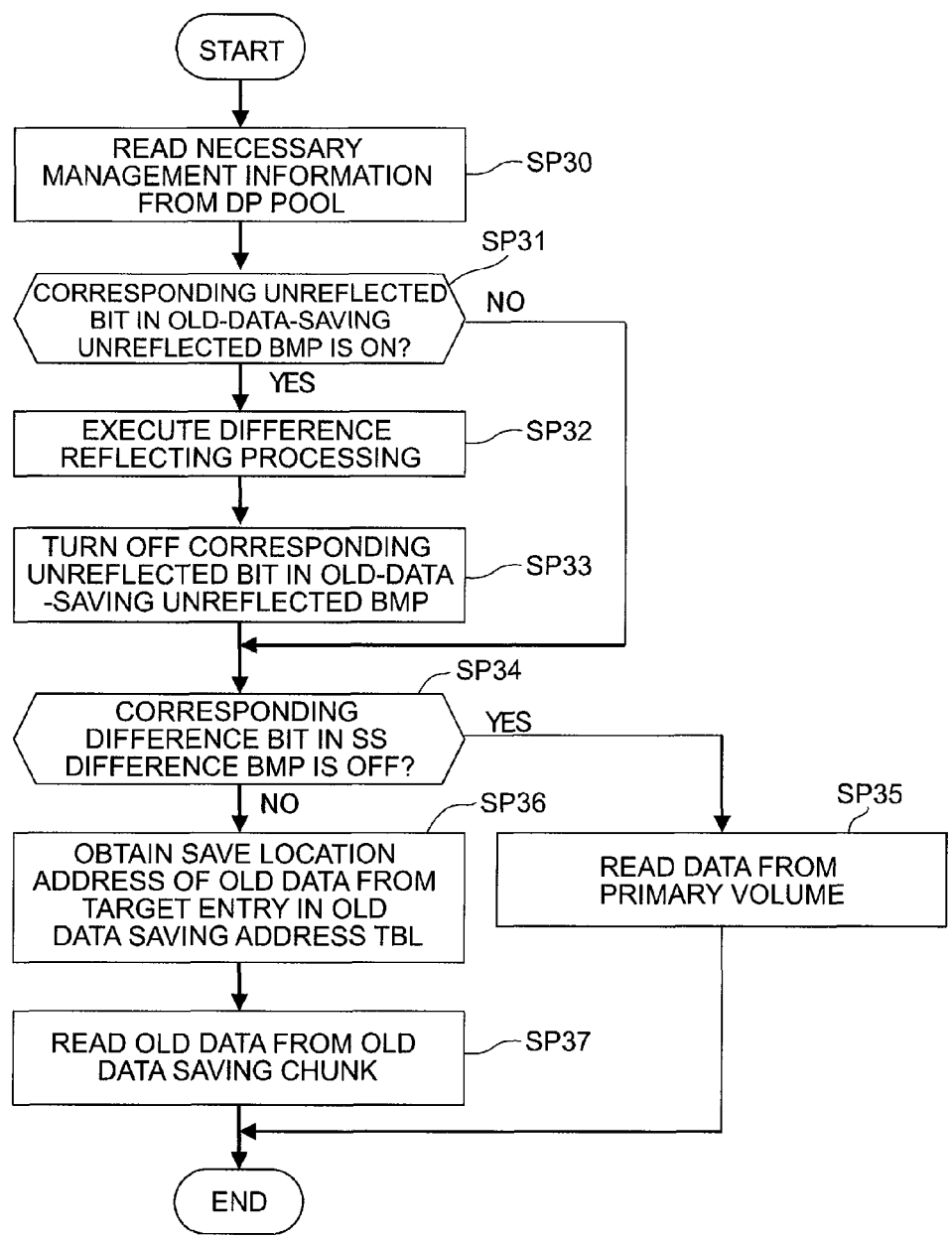
FIG. 24 is a flowchart illustrating a processing sequence for first snapshot read processing.

FIG. 24 shows a processing sequence for first snapshot read processing executed by the CPU 17 when the disk array apparatus 4 receives a read command which is sent from the host computer 3 and whose target is a snapshot (hereinafter referred to as the snapshot read command).

After receiving the relevant snapshot read command, the CPU 17 starts the snapshot read processing shown in FIG. 24; and firstly reads part of the management information stored in the data pool DP that is necessary for the processing, via the back-end interface 14 (FIG. 1) to the cache memory 15 (FIG. 1) (SP30). Therefore, for example, when thereafter referring to or updating the management information during to the first snapshot read processing, reference is made to the management information read to the cache memory 15 or such management information read to the cache memory 15 is updated.

Subsequently, the CPU 17 refers to the corresponding old-data-saving unreflected bitmap 26 (FIG. 15) and judges whether the difference reflecting processing has not been executed on a logical block designated by the relevant snapshot read command as a data real location hereinafter referred to as the read-location logical block) in a snapshot of a generation designated by the snapshot read command as the data read location (hereinafter referred to as the read-location snapshot) (SP31). This judgment is performed by judging whether the unreflected bit which is stored in the unreflected bit field 26BA associated with the read-location logical block in the second entry 26B associated with the read-location snapshot, among the unreflected bit fields 26BA of the relevant old-data-saving unreflected bitmap 26, is "1" or not.

If the CPU 17 obtains a negative judgment result in this step, the processing proceeds to step SP34. On the other hand, if the CPU 17 obtains an affirmative judgment result in step SP31, it refers to the snapshot difference bitmap 21 (FIG. 7), the snapshot difference aggregated bitmap 23 (FIG. 9), and the old data saving address table 24 (FIG. 10) and executes the difference reflecting processing (SP32). Incidentally, targets of the then executed difference reflecting processing are logical blocks of snapshots of all generations corresponding to the read-location logical block(s) of the read-location snapshot (that is, logical blocks with the same LAB as that of the read-location logical block in snapshots of all generations). However, in step SP32, the difference reflecting processing may be executed on all logical blocks of snapshots of all generations on which the difference reflecting processing should be executed.

Next, the CPU 17 changes the unreflected bit stored in the unreflected bit field 26BA corresponding to the logical block, on which the difference reflecting processing was executed for the snapshots of all the generations in step SP32, among the unreflected bit fields 26BA of the old-data-saving unreflected bitmap 26 (FIG. 15), from "1" to "0" (SP33).

Then, the CPU 17 judges whether the difference bit stored in the difference bit field 21BA corresponding to the read-location logical block in the read-location snapshot, among the difference bit fields 21BA of the snapshot difference bitmap 21, is "0" or not (SP34).

An affirmative judgment result in this step means that data of the read-location logical block of the read-location snapshot has not been saved to the data pool DP and the relevant data exists in the primary volume PVOL. Thus, under this circumstance, the CPU 17 reads data from the logical block with the same LBA as that of the read-location logical block in the primary volume PVOL and transfers this data via the cache memory 15 to the host computer 3 which is an issuer of the relevant snapshot read command (SP35). The CPU 17 then terminates this first snapshot read processing.

On the other hand, a negative judgment result in step SP34 means that the data of the read-location logical block of the read-location snapshot has already been saved to the data pool DP and the relevant data does not exist in the primary volume PVOL. Thus, under this circumstance, the CPU 17 reads the address stored the address stored in the address field 24BA corresponding to the read-location logical block of the read-location snapshot (that is, the address of the save location of the data stored in the read-location logical block) among the address fields 24BA of the old data saving address table 24 (FIG. 10) (SP36).

Then, the CPU 17 reads the data, which was saved from the read-location logical block, from the storage area SA2 (FIG. 3) to which the address in the old data saving chunk CK2 (FIG. 3) in the data pool DP as obtained in step SP36 was assigned; and transfers this data via the cache memory 15 to the host computer 3 which is an issuer of the relevant snapshot read command (SP37). The CPU 17 then terminates this first snapshot read processing.

(2-4-4) Second Snapshot Read Processing

On the other hand, FIG. 25 shows a processing sequence for second snapshot read processing executed by the CPU 17 when the disk array apparatus 4 receives a snapshot read command sent from the host computer 3.

The first snapshot read processing described above with reference to FIG. 24 is a version in which the old-data-saving unreflected bitmap 26 is checked before checking the snapshot difference bitmap 21 (see step SP31 and step SP34 in FIG. 24); and this second snapshot read processing is a version in which the snapshot difference bitmap 21 is checked before checking the old-data-saving unreflected bitmap 26 (see step SP41 and step SP44 in FIG. 25).

After receiving the relevant snapshot read command, the CPU 17 starts the second snapshot read processing shown in FIG. 25; and firstly reads part of the management information stored in the data pool DP that is necessary for the processing, via the back-end interface 14 (FIG. 1) to the cache memory 15 (FIG. 1) (SP40). Therefore, for example, when thereafter referring to or updating the management information during to the second snapshot read processing, reference is made to the management information read to the cache memory 15 or such management information read to the cache memory 15 is updated.

Subsequently, the CPU 17 judges whether the difference bit stored in the difference bit field 21BA corresponding to the read-location logical block in the read-location snapshot, among the difference bit fields 21BA of the snapshot difference bitmap 21, is "0" or not (SP41).

A negative judgment result in this step means that data of the read-location logical block of the read-location snapshot has already been saved to the data pool DP and the relevant data does not exist in the primary volume PVOL. Thus, under this circumstance, the CPU 17 reads the address stored in the address field 24BA corresponding to the read-location logical block of the read-location snapshot (that is, the address of the save location of the data stored in the read-location logical block) among the address fields 24BA of the old data saving address table 24 (FIG. 10) (SP42).

Then, the CPU 17 reads the data, which was saved from the read-location logical block, from the storage area SA2 (FIG. 3) to which the address in the data pool DP as obtained in step SP42 was assigned; and transfers this data via the cache memory 15 to the host computer 3 which is an issuer of the relevant snapshot read command (SP43). The CPU 17 then terminates this second snapshot read processing.

On the other hand, an affirmative judgment result in step SP 41 means that data of the read-location logical block of the read-location snapshot has not been saved to the data pool DP and the relevant data exists in the primary volume PVOL, or there is a possibility that the difference reflecting processing has not been executed on the read-location logical block of the read-location snapshot. Thus, under this circumstance, the CPU 17 judges whether the difference reflecting processing has not been executed on the read-location logical block in the read-location snapshot (SP44). Specifically speaking, the CPU 17 judges whether the unreflected bit stored in the unreflected bit field 26BA corresponding to the read-location logical block in the second entry 26B associated with the read-location snapshot, among the unreflected bit fields 26BA (FIG. 15) of the old-data-saving unreflected bitmap 26 (FIG. 15), is "1" or not.

An affirmative judgment result in this step means that there is a possibility the difference reflecting processing has not been executed on the read-location logical block of the read-location snapshot. Thus, under this circumstance, the CPU 17 executes the same difference reflecting processing as in step SP32 of FIG. 24 (SP45).

Next, the CPU 17 changes the unreflected bit stored in the unreflected bit field 26BA corresponding to the logical block on which the difference reflecting processing was executed for the snapshots of all generations in step SP45, among the unreflected bit fields 26BA of the old-data-saving unreflected bitmap 26, from "1" to "0" (SP46) and then the processing returns to step SP41.

On the other hand, a negative judgment result in step SP 44 means that data of the read-location logical block of the read-location snapshot has not been saved to the data pool DP and the relevant data exists in the primary volume PVOL. Thus, under this circumstance, the CPU 17 reads data from the logical block with the same LBA as that of the read-location logical block in the primary volume PVOL and transfers this data via the cache memory 15 to the host computer 3 which is an issuer of the relevant snapshot read command (SP47). The CPU 17 then terminates this second snapshot read processing.

(2-4-5) Snapshot Write Processing

FIG. 26 shows a processing sequence for snapshot write processing executed by the CPU 17 when the disk array apparatus 4 receives a write command which is sent from the host computer 3 and whose target is a snapshot (hereinafter referred to as the snapshot write command).

After receiving the relevant snapshot write command, the CPU 17 starts the snapshot write processing shown in FIG. 26; and firstly reads part of the management information stored in the data pool DP that is necessary for the processing, via the back-end interface 14 (FIG. 1) to the cache memory 15 (FIG. 1) (SP50). Therefore, for example, when thereafter referring to or updating the management information during to the snapshot write processing, reference is made to the management information read to the cache memory 15 or such management information read to the cache memory 15 is updated.

Subsequently, the CPU 17 refers to the old-data-saving unreflected bitmap 26 (FIG. 15) corresponding to a write-location snapshot and judges whether the difference reflecting processing has not been executed on a logical block designated by the relevant snapshot write command as a data write location (the write-location logical block) in a snapshot designated by the relevant snapshot write command as the data write location (hereinafter referred to as the write-location snapshot) (SP51). This judgment is performed by judging whether the unreflected bit which is stored in the unreflected bit field 26BA associated with the write-location logical block in the second entry 26B associated with the write-location snapshot, among the unreflected bit fields 26BA of the relevant old-data-saving unreflected bitmap 26 (FIG. 16), is "1" or not.

If the CPU 17 obtains a negative judgment result in this step, the processing proceeds to step SP54. On the other hand, if the CPU 17 obtains an affirmative judgment result in this step, it refers to the snapshot difference bitmap 21 (FIG. 7), the old data saving address table 24 (FIG. 10), and the snapshot difference aggregated bitmap 23 (FIG. 9) and executes the difference reflecting processing (SP52). Incidentally, targets of the then executed difference reflecting processing are logical blocks of snapshots of all generations corresponding to the write-location logical block(s) of the write-location snapshot (that is, logical block(s) with the same LAB as that of the write-location logical block for snapshots of all generations). However, in step SP52, the difference reflecting processing may be executed on all logical blocks of snapshots of all generations on which the difference reflecting processing should be executed.

Next, the CPU 17 changes the unreflected bit stored in the unreflected bit field 26BA corresponding to the logical block, on which the difference reflecting processing was executed for the snapshots of all the generations in step SP52, among the unreflected bit fields 26BA (FIG. 15) of the old-data-saving unreflected bitmap 26 (FIG. 15), from "1" to "0" (SP53).

Subsequently, the CPU 17 judges whether data stored in the logical block in the primary volume PVOL which is associated with the write-location logical block of the snapshot (hereinafter referred to as the write-location-associated logical block) has not been saved to the data pool DP (SP54). This judgment is performed by judging whether the difference bit stored in the difference bit field 21BA corresponding to the write-location-associated logical block in the snapshot difference bitmap 21 is "0" or not.

Then, if the CPU 17 obtains a negative judgment result in this step, the processing proceeds to step SP62. On the other hand, if the CPU 17 obtains an affirmative judgment result in this step, it refers to the unused old-data-saving area bitmap 25 (FIG. 11) and determines a save location of the data stored in the write-location-associated logical block (SP55).

Specifically speaking, the CPU 17 judges whether or not any unused storage area SA2 (FIG. 3) of a sufficient size to save the data stored in the relevant write-location-associated logical block (old data) exists in the old data saving chunk CK2 (FIG. 3) associated with the corresponding primary volume PVOL in the data pool DP. If the CPU 17 determines that such an unused storage area exists, it secures the storage area SA2 of a sufficient size capable of saving the relevant data in the relevant old data saving chunk CK2 and determines the secured storage area SA2 as the save location of the relevant data. Furthermore, if the CPU 17 determines that such an unused storage area does not exist in the old data saving chunk CK2 associated with the write-location primary volume PVOL in the data pool DP, it creates a new old data saving chunk CK2 associated with the relevant write-location primary volume PVOL in the data pool DP, secures a storage area SA2 of a size capable of saving the data of the relevant write-location-associated logical block in the relevant old data saving chunk CK2, and determines the secured storage area SA2 as the save location of the relevant data.

Subsequently, the CPU 17 registers the save location of the data (old data), which is stored in the write-location-associated logical block in the write-location primary volume PVOL, in the old data saving address table 24 (FIG. 10) (SP56). Specifically speaking, the CPU 17 stores the address of the storage area SA2 in the data pool DP, which was determined as the save location of the data in step SP 55, in the address field 24BA associated with the write-location-associated logical block among the second entries 24B in the old data saving address table 24.

Furthermore, the CPU 17 changes the empty bit, which is stored in the empty bit field 25AA corresponding to the storage area SA2 determined as the save location of the data in step SP55 among the empty bit fields 25AA in the unused old-data-saving area bitmap 25 (FIG. 11), from "0" to "1" (SP57).

Subsequently, the CPU 17 reads data stored in the write-location-associated logical block in the write-location primary volume PVOL (old data) from the write-location primary volume PVOL and merges it with the write data. Then, the CPU 17 saves the merged data obtained by merging to the storage area SA2 in the data pool DP, which was determined in step SP55 (SP58).

Next, the CPU 17 changes the difference aggregated bit, which is stored in the difference aggregated bit field 23BA associated with the write-location-associated logical block in the write-location primary volume PVOL in the snapshot difference aggregated bitmap 23 (FIG. 9), from "0" to "1" (SP59) and changes the write difference bit, which is stored in the write difference bit field 28BA (FIG. 21) associated with the write-location logical block in the snapshot write difference bitmap 28 (FIG. 21), from "0" to "1" (SP60). The CPU 17 also changes the difference bit, which is stored in the difference bit field 21BA associated with the write-location logical block in the snapshot difference bitmap 21, from "0" to "1" (SP61).

Subsequently, the CPU 17 judges whether or not data saved from the write-location-associated logical block in the primary volume PVOL to the data pool DP (old data) is shared with snapshots of different generations from that of the write-location snapshot (SP62). This judgment is performed by judging whether the same address as the address stored in the address field 24BA corresponding to the write-location logical block in the old data saving address table 24 (FIG. 10) is stored in other address fields 24BA of the relevant old data saving address table 24.

If the CPU 17 obtains an affirmative judgment result in this step, the processing returns to step SP55 and then the processing in step SP55 to step SP62 is executed sequentially as described above. As a result, the CPU 17 determines a storage area SA2 which should be a save location of the data in the write-location logical block of the write-location snapshot from the corresponding old data saving chunk CK2 in the data pool DP (a copy destination of the old data which has already been saved to the data pool DP) and registers the address of the determined storage area SA2 in the corresponding address field 24BA of the old data saving address table 24.

If the CPU 17 then obtains an affirmative judgment result in step SP62, it obtains the address stored in the address field 24BA associated with the write-location logical block of the write-location snapshot among the address fields 24BA of the old data saving address table 24 (SP63) and overwrites data at the position of the address in the data pool DP, which was obtained in step SP63, with the write data (SP64).

The CPU 17 then terminates this snapshot write processing.

(2-4-6) Pair Deletion Processing

Figure 27A:
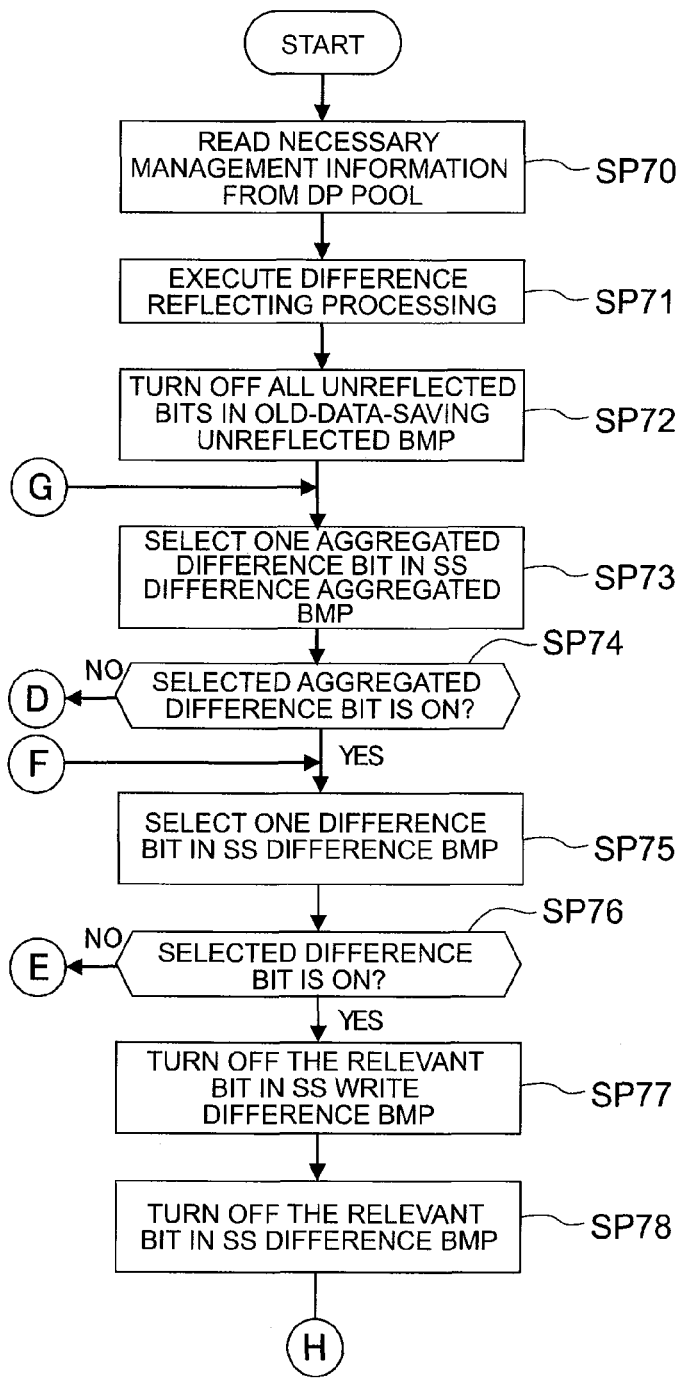
FIG. 27A is a flowchart illustrating a processing sequence for pair deletion processing.
Figure 27B:
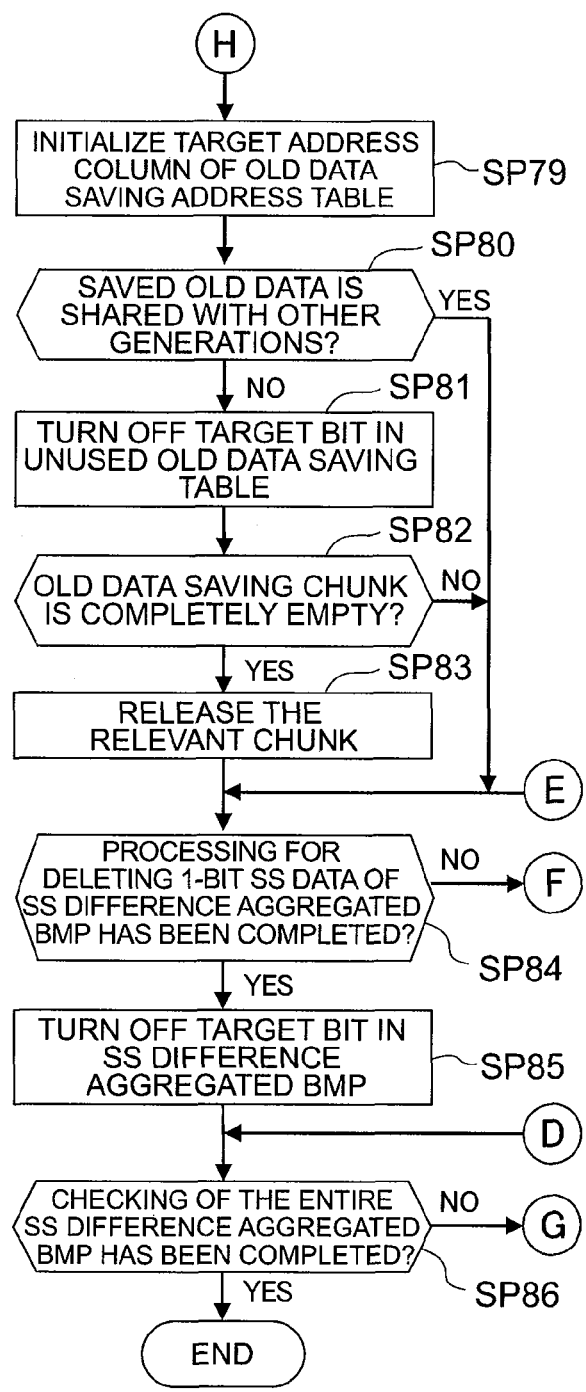
FIG. 27B is a flowchart illustrating a processing sequence for the pair deletion processing.

FIG. 27A and FIG. 27B show a processing sequence for pair cancellation processing executed by the CPU when the disk array apparatus 4 receives a command from the host computer 3 to cancel a copy pair of a primary volume PVOL and a snapshot volume SSVOL (that is, a command to delete a snapshot retained by the relevant snapshot volume SSVOL; hereinafter referred to as the pair cancellation command).

After receiving the pair cancellation command, the CPU 17 starts the pair cancellation processing as shown in FIG. 27A and FIG. 27B; and firstly reads part of the management information stored in the data pool DP that is necessary for the processing, via the back-end interface 14 (FIG. 1) to the cache memory 15 (FIG. 1) (SP70). Therefore, for example, when thereafter referring to or updating the management information during to the pair deletion processing, reference is made to the management information read to the cache memory 15 or such management information read to the cache memory 15 is updated.

Subsequently, the CPU 17 refers to the snapshot difference bitmap 21 (FIG. 7), the snapshot difference aggregated bitmap 23 (FIG. 9), and the old data saving address table 24 (FIG. 10) and executes the difference reflecting processing on all logical blocks in all snapshots (SP71). Also, the CPU 17 then changes all the unreflected bits stored in each unreflected bit field 26BA (FIG. 15) of the old-data-saving unreflected bitmap 26 (FIG. 15) from "1" to "0" (SP72).

Next, the CPU 17 selects one difference aggregated bit field 23BA in the second entry 23B associated with a snapshot retained by the snapshot volume SSVOL designated by the pair cancellation command as a target of the pair cancellation processing (hereinafter referred to as the target snapshot) among the second entries 23B in the snapshot difference aggregated bitmap 23 (FIG. 9) (SP73) and judges whether the difference aggregated bit stored in the relevant difference aggregated bit field 23BA is "1" or not (SP74)

A negative judgment result in this step means that each of all the difference bits associated with the relevant difference aggregated bit in the snapshot difference bitmap 21 is "0" and, therefore, any of data stored in each logical block in the target snapshot associated with each of these difference bits has not been saved to the data pool DP. Thus, under this circumstance, the CPU 17 proceeds to step SP86.

On the other hand, an affirmative judgment result in step SP 74 means that at least one of the difference bits associated with the relevant difference aggregated bit in the snapshot difference bitmap 21 is "1" and the data stored in the logical block in the target snapshot associated with the relevant difference bit has been saved to the data pool DP. Thus, under this circumstance, if the relevant data saved to the relevant data pool DP is not shared with snapshots of other generations, the CPU 17 executes the following processing to delete the relevant data from the data pool DP.

Specifically speaking, the CPU 17 firstly selects one difference bit associated with the difference aggregated bit selected in step SP73 among the difference bits in the snapshot difference bitmap 21 (SP75) and judges whether the relevant difference bit is "1" or not (SP76). If the CPU 17 obtains a negative judgment result in this step, the processing proceeds to step SP84.

On the other hand, if the CPU 17 obtains an affirmative judgment result in step SP76, that is, if the write difference bit corresponding to the relevant difference bit, among the write difference bits in the snapshot write difference bitmap 28, is "1," the CPU 17 changes that write difference bit to "0"

(SP77) and also changes the difference bit selected in step SP75 in the snapshot difference bitmap 21 from "1" to "0" (SP78).

The CPU 17 also initializes the address field 24BA (FIG. 10) corresponding to the relevant difference bit in the old data saving address table 24 (FIG. 10) (changes the address stored in the relevant address field 24BA to the initial value "0") (SP79).

Furthermore, the CPU 17 judges whether or not the old data saved to the data pool DP from the logical block corresponding to the difference bit selected in step SP75, among the respective logical blocks in the target snapshot, is shared with snapshots other than the target snapshot, in the same manner as in step SP62 of the snapshot write processing explained earlier with reference to FIG. 26 (SP80).

An affirmative judgment result in this step means that the old data saved to the data pool DP from the logical block corresponding to the difference bit selected in step SP75 is shared with other snapshots and, therefore, the relevant old data cannot be deleted from the data pool DP. Thus, under this circumstance, the CPU 17 proceeds to step SP84.

On the other hand, a negative judgment result in step SP80 means that the old data saved to the data pool DP from the logical block corresponding to the difference bit selected in step SP75 is not shared with other snapshots and, therefore, the relevant data can be deleted from the data pool DP. Thus, under this circumstance, the CPU 17 changes the empty bit stored in the empty bit field 25AA corresponding to the storage area SA2 (FIG. 3) in the data pool DP storing the relevant old data, among the empty bits stored in the empty bit fields 25AA of the unused old-data-saving area bitmap 25 (FIG. 11), from "1" to "0" (SP81).

Subsequently, the CPU 17 judges whether or not the old data (old data saved from the primary volume PVOL) has been completely deleted from the old data saving chunk CK2 (FIG. 3) in the data pool DP as a result of the processing in step SP81 (SP82).

If the CPU 17 obtains a negative judgment result in this step, the processing proceeds to step SP84. On the other hand, if the CPU 17 obtains an affirmative judgment result, it releases the relevant old data saving chunk CK2 (SP83).

Next, the CPU 17 judges whether or not the execution of the processing in step SP74 to step SP83 has been terminated on all the difference bits corresponding to the difference aggregated bit selected in step SP73 among the difference bits in the snapshot difference bitmap 21 (FIG. 7) (SP84).

If the CPU 17 obtains a negative judgment result in this step, the processing proceeds to step SP75; and then the CPU 17 repeats the processing in step SP76 to step SP84 by changing the difference bit selected in step SP75 to another difference bit.

If the CPU 17 then obtains an affirmative judgment result in step SP84 by terminating the execution of the processing in step SP74 to step SP83 on all the difference bits associated with the difference aggregated bit selected in step SP73, it changes the difference aggregated bit selected in step SP73 from "1" to "0" (SP85).

Subsequently, the CPU 17 judges whether or not the execution of the processing in step SP73 to step SP85 has been terminated on all the difference aggregated bits in the second entry 23B associated with the target snapshot among the second entries 23B in the snapshot difference aggregated bitmap 23 (SP86).

If the CPU 17 obtains a negative judgment result in this step, the processing returns to step SP73; and the CPU 17 then repeats the processing in step SP73 to step SP86 by sequentially switching the difference aggregated bit selected in step SP73 to another difference aggregated bit in the second entry 23B associated with the target snapshot.

Then, if the CPU 17 obtains an affirmative judgment result in step SP86 by terminating the execution of the processing in step SP73 to step SP85 on all the difference aggregated bits in the second entry 23B associated with the target snapshot, it terminates this pair deletion processing.

Incidentally, if the pair settings of all the snapshot volumes SSVOL which are set to the copy pairs with the same primary volume PVOL are cancelled as a result of the above-described pair deletion processing (that is, if all the snapshots obtained for the same primary volume PVOL are deleted), the management information storing chunk CK1 (FIG. 3) which stores the management information used by the relevant primary volume PVOL is released at that timing.

(3) Management Information Access System According to this Embodiment (3-1) Generation Block Next, an access system of the disk array apparatus 4 according to this embodiment which is used when the CPU 17 reads necessary management information of snapshots from the data pool DP to the cache memory 15 or access the management information which has been read to the cache memory 15 will be explained.

Since this disk array apparatus 4 can obtain a maximum of 1024 snapshots for the same primary volume PVOL as described above, the management information of these 1024 snapshots will be an enormous amount of data. So, with this disk array apparatus 4, the pair management table 20 (FIG. 6) and the split order number-generation number mapping table 27 (FIG. 17) among the management information of the snapshots are made to reside in the cache memory 15 for the controller 11; however, the other management information, that is, the snapshot difference bitmap 21 (FIG. 7), the primary volume difference bitmap 22 (FIG. 8), the snapshot difference aggregated bitmap 23 (FIG. 9), the old data saving address table 24 (FIG. 10), the unused old-data-saving area bitmap 25 (FIG. 11), the old-data-saving unreflected bitmap 26 (FIG. 15), and the snapshot write difference bitmap 28 (FIG. 21) are retained in the data pool and the disk array apparatus 4 uses a system for reading (staging) only necessary management information from the data pool DP to the cache memory 15 when needed.

In this case, this disk array apparatus 4 is characterized in that it reads only necessary bits to the cache memory 15 with respect to the primary volume difference bitmap 22, the unused old-data-saving area bitmap 25, the old-data-saving unreflected bitmap 26 whose data amount is small; and on the other hand, the disk array apparatus 4 changes the number of generations and the LBA range to be read from the data pool DP to the cache memory 15 with respect to the snapshot difference bitmap 21, the snapshot difference aggregated bitmap 23, the old data saving address table 24, and the snapshot write difference bitmap 28, according to the number of generations of snapshots existing at that time.

Figure 28:
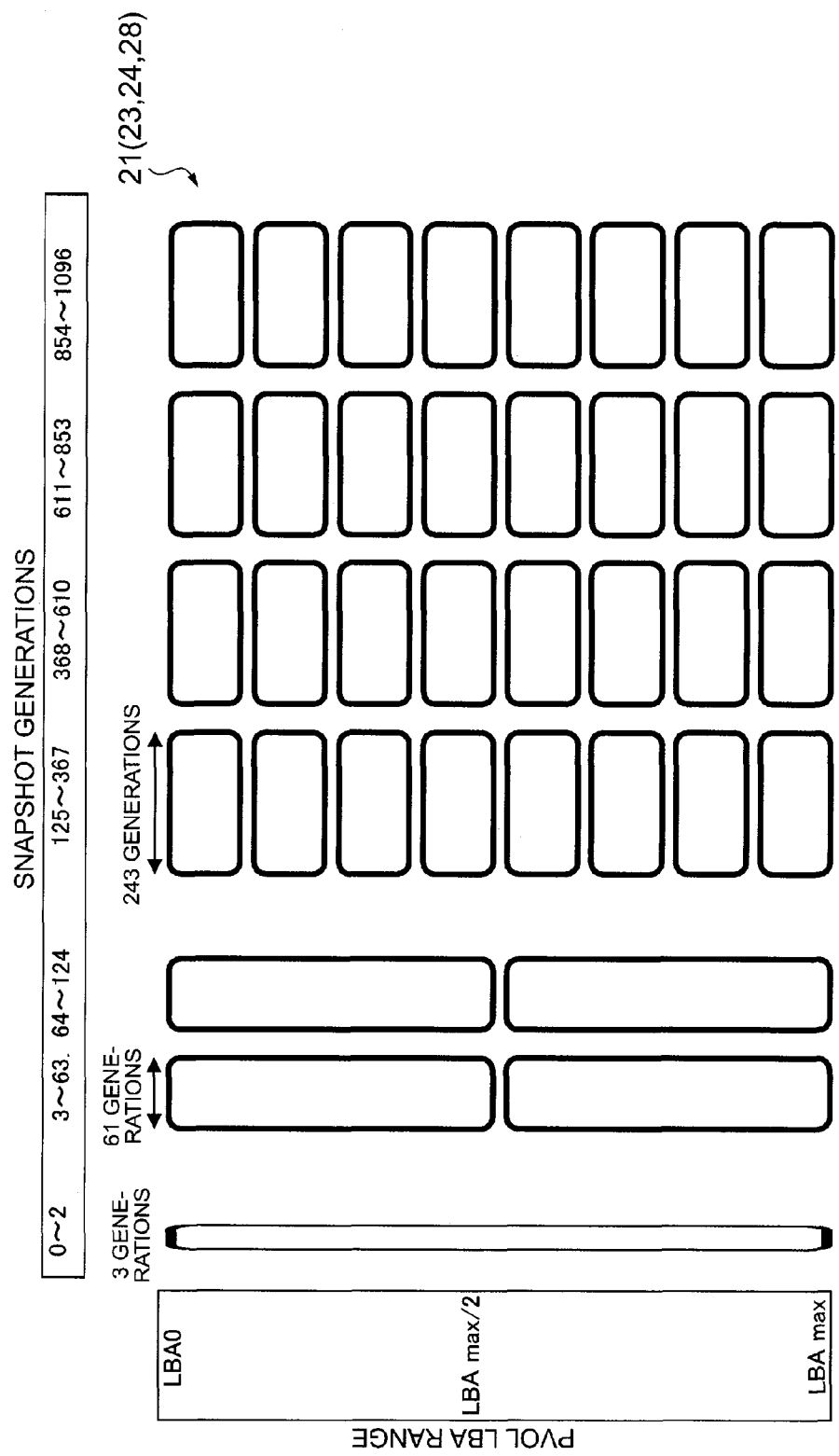
FIG. 28 is a conceptual diagram for explaining generation blocks.

In fact, in this embodiment, regarding three generations whose generation number is "0" to "2," a set of the management information of snapshot of all these three generations is recognized as one block (hereinafter referred to as the 3-generation block) and the management information is read from the data pool DP to the cache memory 15 on a 3-generation block basis when needed as shown in FIG. 28.

Furthermore, with respect to 61 generations whose generation number is "3" to "63," pieces of management information of all logical blocks with smaller LBAs, which constitute a first half of the 61 generations, are gathered and formed into one block and pieces of management information of all logical blocks with larger LBAs, which constitute a second half of the 61 generations, are gathered and formed into one block and the management information is read from the data pool DP to the cache memory 15 on this block basis (each block will be hereinafter referred to as the 61-generation block) when needed. In other words, the 61-generation block is the management information that corresponds to logical blocks with a narrower range of LBAs than that of the 3-generation block and corresponds to a larger number of generations than those of the 3-generation block.

Furthermore, with respect to generations whose the generation number is "125" and larger, the generations are divided into sets of 243 generations; pieces of management information of snapshots of the individual 243 generations are divided into a specified number of logical blocks according to the LBA of the logical blocks; and the management information of snapshots of the specified number of logical blocks, among the management information of snapshots of the 243 generations, is recognized as an individual block (each such block will be hereinafter referred to as the 243-generation block) and the management information is read from the data pool DP to the cache memory 15 on this 243-generation block basis when needed. In other words, the 243-generation block is the management information that corresponds to logical blocks with a narrower range of LBAs than that of the 61-generation block and corresponds to a larger number of generations than those of the 61-generation block.

Specifically speaking, the "generation block" means a data unit used when the CPU 17 accesses the management information of snapshots of a plurality of generations and is a unit of the management information of snapshots that the CPU 17 reads from the data pool DP to the cache memory 15 at once or accesses in the cache memory 15.

This disk array apparatus 4 is designed, as a result of specifying the range of the generation block as described above, so that when the number of generations of snapshots obtained for the same primary volume PVOL is small, cache hits of the management information of logical blocks in a wider range are possible even with the small number of generations; and when the number of generations of snapshots obtained for the same primary volume PVOL is large, cache hits of the management information of a large number of generations are possible.

Incidentally, in the case of this embodiment, it is possible to internally retain management information of snapshots of 1097 generations as compared to 1024 generations provided as an external specification as is obvious from FIG. 28, so that management information of snapshots of 73 more generations can be retained than the external specification. This is because snapshot resynchronization, deletion, and restoration require a lot of time for initialization of the management information and background processing of the data saved to the data pool DP (old data) and a storage area of the data pool DP which stores the management information of snapshot(s) of the relevant generation(s) cannot be used during that time. In other words, this disk array apparatus 4 is designed so that since a margin of the 73 generations is secured as described above, even if the operation to delete all the snapshots of 1024 generations is performed, at least snapshots of the 73 generations can be generated immediately.

(3-2) Assignment of Generation Number to Snapshots

Next, an assignment system for this disk array apparatus 4 to assign the generation number to snapshots will be explained.

(3-2-1) General Rule

In the case of this disk array apparatus 4, as a general rule, a smaller generation number is assigned to a snapshot retained by a snapshot volume SSVOL which is earlier in the split order in which it is split from the primary volume PVOL. Then, if available generation numbers occur because of, for example, deletion of snapshot volumes SSVOL, the available generation numbers are assigned consecutively in the ascending order from the smallest number of the available generation numbers to new snapshots.

Figure 29A:
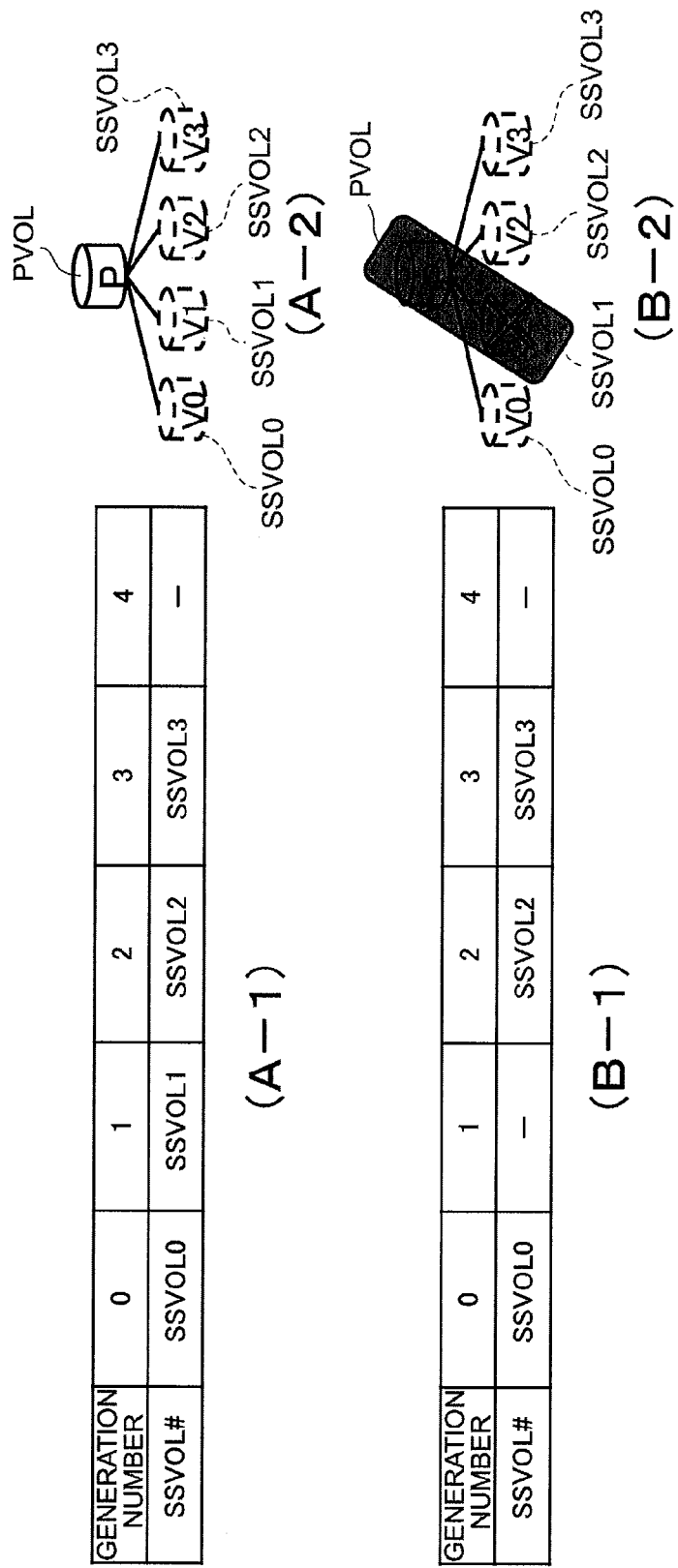
FIGS. 29A (A-1) to (B-2) are conceptual diagrams for explaining a system for assigning a generation number to snapshots.

For example, in the initial state where any of snapshot volumes SSVOL which are set as copy pairs with the primary volume PVOL are not deleted as shown in FIG. 29A (A-1) and FIG. 29A (A-2), a smallest generation number is sequentially assigned to the relevant snapshot every time a snapshot is obtained by having a snapshot volume SSVOL0 to SSVOL2 split from the primary volume PVOL.

Incidentally, FIG. 29A (A-1) and FIG. 29A (A-2) show a state where the snapshot volume SSVL0 to SSVL3 is sequentially split from the primary volume PVOL and the generation number "0" to "3" is assigned to each snapshot thereby retained by each snapshot volume SSVL0 to SSVL3. Furthermore, in this example, it is assumed that the pair status of a copy pair of the primary volume PVOL and a snapshot volume SSVOL4 is "Paired."

Then, when the snapshot volume SSVOL1 enters a resynchronization state where the content of the relevant snapshot volume SSVOL1 is made to become identical to the primary volume PVOL again (the pair status is "Paired"), a snapshot retained by the snapshot volume SSVOL1 is deleted and accordingly the generation number "1" becomes unused as shown in FIG. 29A (B-1) and FIG. 29A (B-2). Furthermore, as a result of the deletion of the snapshot retained by the relevant snapshot volume SSVOL1, initialization of the management information of the relevant snapshot is executed.

Figure 29B:
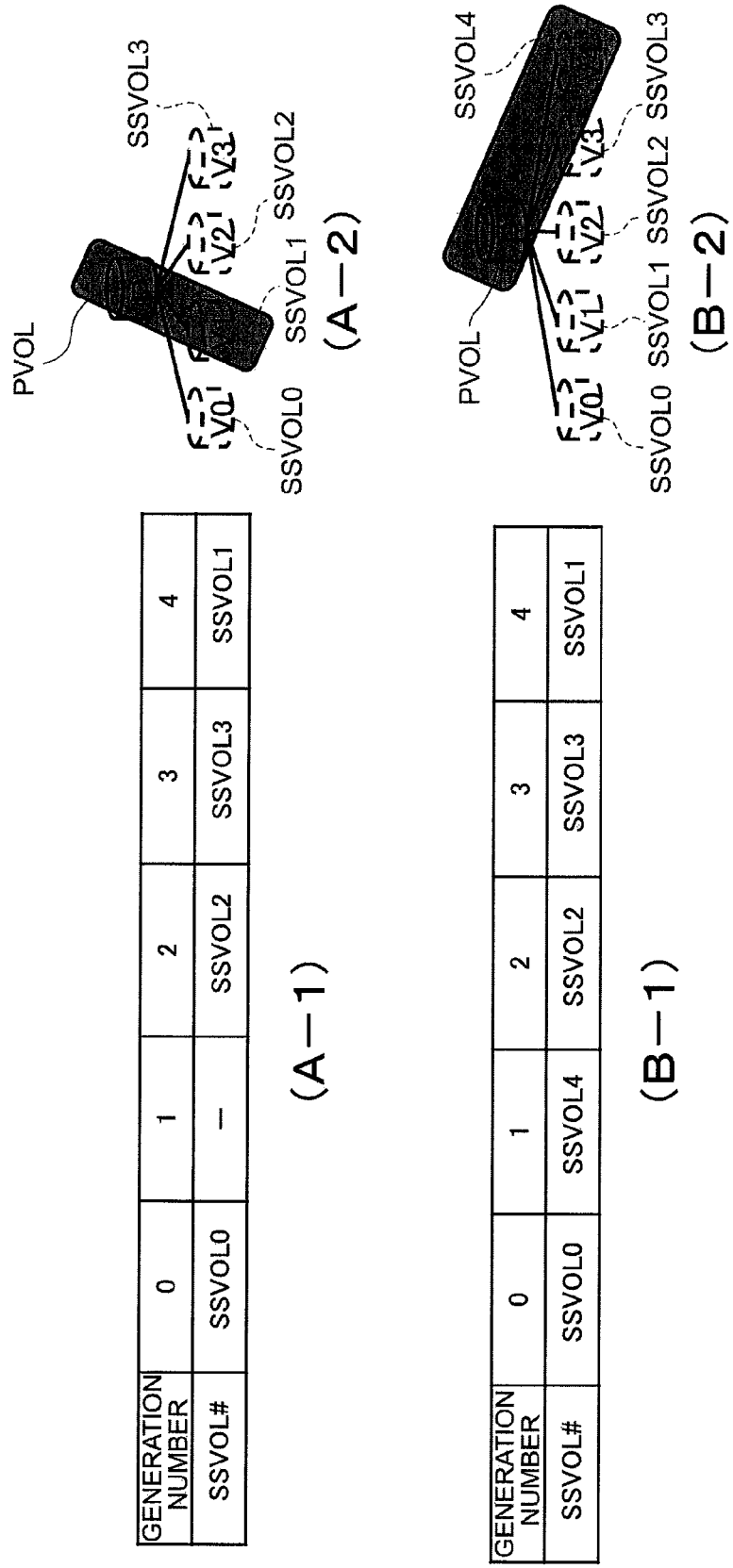
FIGS. 29B (A-1) to (B-2) are conceptual diagrams for explaining a system for assigning the generation number to snapshots.

Subsequently, for example, if the snapshot volume SSVOL1 is split from the primary volume PVOL again before the initialization processing on the management information of the snapshot of the first generation (the generation number is "1"), the generation number "4" is assigned to the snapshot retained by the snapshot SSVOL1 as shown in FIG. 29B (A-1) and FIG. 29B (A-2).

Subsequently, if the snapshot volume SSVOL4 is split from the primary volume PVOL after the initialization processing on the management information of the snapshot of the first generation (the generation number is "1") is completed and the generation number "1" becomes available, the generation number "1" which is the smallest unused generation number at that time is assigned to the snapshot retained by the snapshot volume SSVOL4 as shown in FIG. 29B (B-1) and FIG. 29B (B-2).

Incidentally, the generation number is assigned to a snapshot as described above when the primary volume PVOL is accessed (write-accessed or read-accessed) for the first time after the acquisition of the snapshot; and the generation number to be assigned to the relevant snapshot is decided at that timing.

(3-2-2) Exceptions

As a general rule, when assigning the generation number to a first snapshot obtained for the primary volume PVOL, this disk array apparatus 4 assigns the smallest generation number (that is, the $0^{th}$ generation) among the generations constituting the 3-generation block; and then every time the disk array apparatus 4 obtains a snapshot, it sequentially assigns the smallest generation number of the remaining generations to the relevant snapshot as shown in FIG. 30 (A) as described above.

On the other hand, one of the characteristics of the disk array apparatus 4 is that when and after this disk array apparatus 4 finishes assigning all the generation numbers of the generations constituting the 3-generation block (the $0^{th}$ generation to the third generation) to snapshots and starts assigning the generation numbers constituting the first 61-generation block to snapshots (that is, after assigning the generation number of the fourth generation), it does not newly assign the generation number from the 3-generation block and assigns the generation number of generations constituting the generation block(s) after the 3-generation block as shown in FIG. 30 (B) even if there is an available generation number in the 3-generation block (the first generation in FIG. 30 (B)) due to deletion of the snapshot.

This characteristic is intended to enhance the performance by curbing the number of times of reading the management information (the snapshot difference bitmap 21, the snapshot difference aggregated bitmap 23, the old data saving address table 24, and/or the snapshot write difference bitmap 28) from the data pool DP to the cache memory 15.

Specifically speaking, if the number of snapshots obtained for the same primary volume PVOL is small enough to be covered by the 3-generation block (that is, up to three generations), good performance can be achieved by allocating the management information to the 3-generation block. However, if the number of snapshots obtained for the same primary volume PVOL becomes more than that, it is necessary to read the management information from the data pool DP for a plurality of generation blocks to the cache memory 15 every time the management information is updated, thereby causing performance degradation.

So, in the case of this disk array apparatus 4, the generation numbers constituting the 3-generation block are used at the time of initial introduction and after that the generation numbers constituting the 61-generation blocks and any subsequent generation blocks are assigned to snapshots as much as possible. As a result, the necessity to read the management information of snapshots, to which the generation numbers constituting the 3-generation block are assigned, from the data pool DP to the cache memory 15 is eliminated and the performance can be enhanced.

For example, in the examples shown in FIG. 30 (A) and FIG. 30 (B) when processing a snapshot of the generation number belonging to the 61-generation block, it is necessary to read the management information of a snapshot of each generation number belonging to the 3-generation block and the management information of a snapshot of each generation number belonging to the 61-generation block from the data pool DP to the cache memory 15; and the processing for reading the management information of the snapshot is required twice. However, if the snapshot of each generation number belonging to the 3-generation block is then deleted, it is only necessary to read the management information of the snapshot of the generation number belonging to the 61-generation block as shown in FIG. 30 (C) by executing the above-described generation number assignment processing; and, therefore, such read processing can be completed by executing it once.

(3-2-3) Generation Number Assignment Processing

Figure 31:
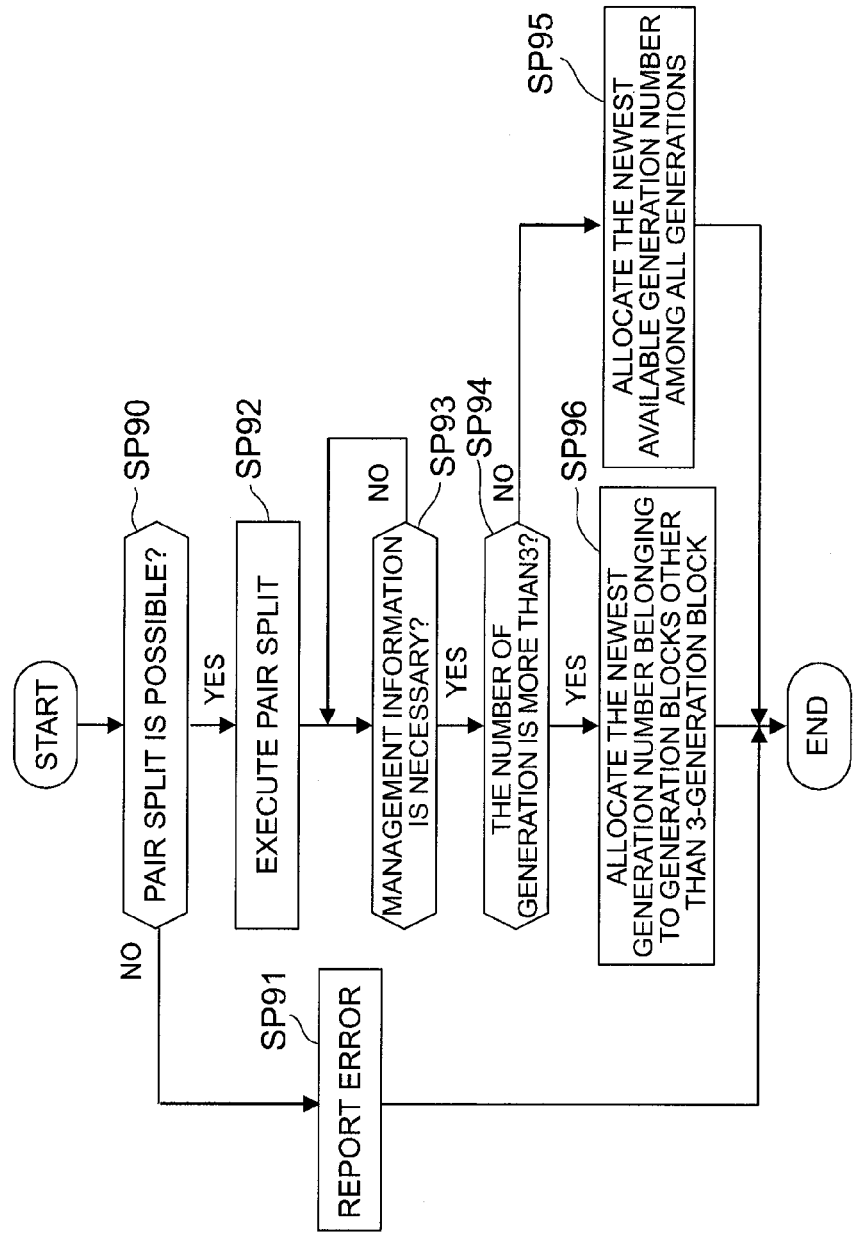
FIG. 31 is a flowchart illustrating a processing sequence for generation number assignment processing.

FIG. 31 shows a specific processing sequence for the generation number assignment processing for assigning the generation number to snapshots. The CPU 17 assigns the generation number to a newly obtained snapshot in accordance with the processing sequence shown in FIG. 31.

Specifically speaking, after receiving a pair split command to split a copy pair of a primary volume PVOL and a snapshot volume SSVOL, the CPU 17 starts this generation number assignment processing; and firstly searches for the pair status of that pair, which is registered in the pair management table 20 (FIG. 6), and judges whether or not the relevant copy pair is in a state where it can be split (a snapshot can be obtained) (SP90).

In this case, for example, if the pair status of the target copy pair (hereinafter referred to as the target pair) is already in a "Split" state (a snapshot has already been obtained) or the relevant pair status is "Simplex," the relevant copy pair cannot be split. Thus, if the CPU 17 obtains a negative judgment result in step SP90, it notifies the host computer 3, which is a sender of the pair split command, of an error (SP91) and then terminates this generation number assignment processing.

On the other hand, if the CPU 17 obtains an affirmative judgment result in step SP90, it splits the target pair (SP92). Specifically speaking, the CPU 17 changes the pair status, which is stored in the pair status field 20C in the entry 20A (FIG. 6) corresponding to the target pair in the pair management table 20, to "Split."

Subsequently, the CPU 17 waits for the time when the management information of the relevant snapshot is required, that is, for example, when receiving a command to access the snapshot obtained by pair splitting in step SP92 (SP93).

Then, when the management information of the relevant snapshot is required, the CPU 17 judges whether the number of generations of snapshots currently obtained for the corresponding primary volume PVOL is more than 3 (SP94).

If the CPU 17 obtains an affirmative judgment result in this step, it selects the smallest generation number among the generation numbers belonging to generation blocks other than the 3-generation block and assigns that generation number to the relevant snapshot (SP95). The CPU 17 then terminates this generation number assignment processing.

On the other hand, if the CPU 17 obtains a negative judgment result in step SP94, it selects the smallest generation number among all generation numbers belonging to all generation blocks including the 3-generation block and assigns that generation number to the relevant snapshot (SP96). The CPU 17 then terminates this generation number assignment processing.

(3-2-4) Management Information Acquisition Processing

Figure 32:
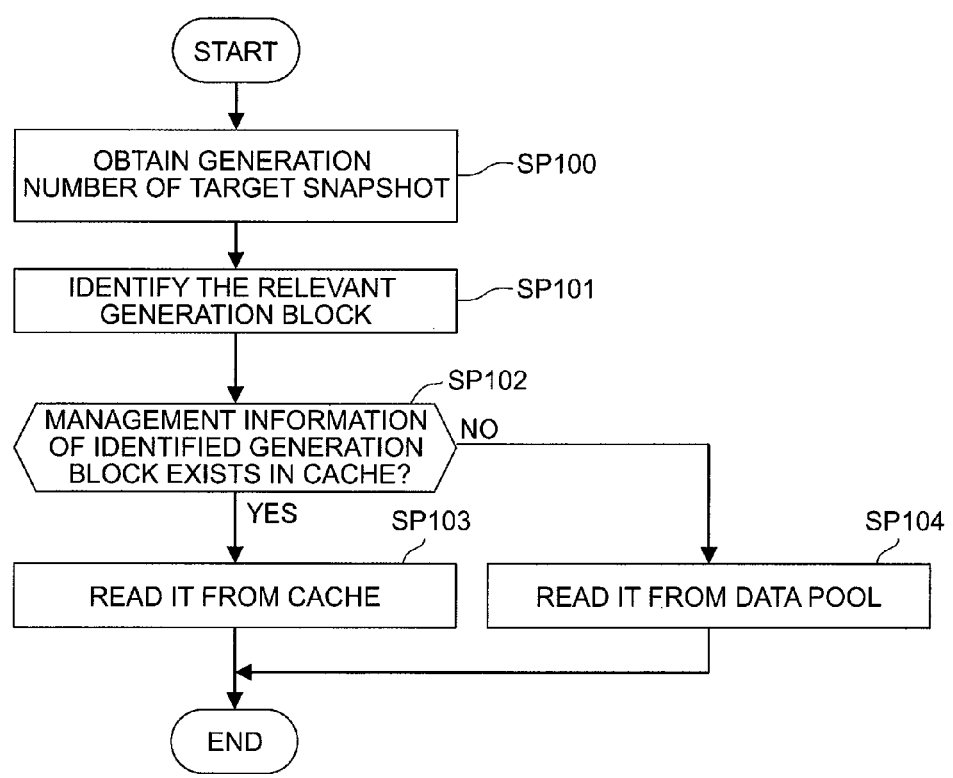
FIG. 32 is a flowchart illustrating a processing sequence for management information acquisition processing.

FIG. 32 shows a processing sequence for management information acquisition processing executed by the CPU 17 when a command, such as a write command, a read command, or a pair operation command to operate a copy pair, that requires the management information of the corresponding snapshot in order to execute the corresponding processing is issued from the host computer 3 to the disk array apparatus 4. Incidentally, with this type of commands, the LUN of a target logical volume VOL (for example, the primary volume PVOL and/or the snapshot volume SSVOL) and the target LBA in that logical volume VOL are normally designed. So, the following explanation will be given on the premise that such LUN and LBA are designated.

After receiving the command, the CPU 17 starts the management information acquisition processing shown in FIG. 32; and firstly refers to the pair management table 20 (FIG. 6) and obtains the generation number of a target snapshot of the command (SP100). For example, if the CPU 17 receives a write command whose target is a snapshot volume SSVOL with LUN "1," it searches entries 20A (FIG. 6) in the pair management table 20 for an entry 20A which stores "1" in the LUN field 20D (FIG. 6); and then obtains the generation number ("1" in FIG. 6) stored in the generation number field 20E (FIG. 6) of that entry 20A. This generation number is the generation number of the snapshot retained by the relevant snapshot volume SSVOL.

Then, the CPU 17 identifies to which generation block the necessary management information of the snapshot to execute the processing according to the command belongs, based on the generation number of the target snapshot obtained in step SP100, and the LBA range which is a processing target recognized based on the command (SP101).

Subsequently, the CPU 17 judges whether or not the management information of the generation block identified in step SP101 exists in the cache memory 15 (FIG. 1) (SP102). In this case, the CPU 17 always manages the generation blocks existing in the cache memory 15 as management information staging information. Therefore, the above judgment is made based on this management information staging information.

Then, if the CPU 17 obtains an affirmative judgment result in this step, it reads the management information of the generation block identified in step SP101 from the cache memory 15 (SP103) and then terminates this management information acquisition processing. Furthermore, if the CPU 17 obtains a negative judgment result in step SP104, it reads the management information of the generation block identified in step SP102 from the data pool DP to the cache memory 15 (SP104) and then terminates this management information acquisition processing.

As a result, the CPU 17 then executes processing according to the above-described command based on the management information of the generation block obtained in step SP103 or step SP104.

(4) Advantageous Effects of this Embodiment

The disk array apparatus 4 according to this embodiment as described above is designed so that it retains the management information of snapshots in the data pool DP and reads only necessary management information to the cache memory 15 in the controller 11 when needed. So, the number of snapshots that can be obtained is not limited by the memory capacity of the cache memory 15. Therefore, this disk array apparatus 4 can obtain more snapshots than a conventional disk array apparatus regarding which the number of snapshots is limited by the memory capacity of the cache memory.

Furthermore, when writing data to the primary volume PVOL, this disk array apparatus 4 updates only the management information of a snapshot of the latest generation among snapshots of a plurality of generations which share the old data; and with respect to the management information of snapshots of the remaining generations, the disk array apparatus 4 updates the management information when any of the remaining snapshots is accessed or when any of the remaining snapshots is deleted. Therefore, it is possible to effectively prevent the processing load of the processing for updating the snapshot management information from adversely affecting the write performance to write data to the primary volume PVOL. As a result, the reliability of the disk array apparatus 4 as a whole can be enhanced.

(5) Other Embodiments

Incidentally, the above-described embodiment has described a case where the present invention is applied to the disk array apparatus configured as shown in FIG. 1. However, the invention is not limited to such a configuration and the present invention can be applied to a wide variety of storage apparatuses having various other configurations.

Moreover, the above-described embodiment has described a case where the difference reflecting processing is executed when a snapshot on which the difference reflecting processing should be executed is accessed or when the snapshot is deleted. However, the present invention is not limited to this example and the difference reflecting processing may be executed at timing other than the above-described example.

Furthermore, the above-described embodiment has described a case where the cache memory 15 is used as a memory for reading the management information of snapshots retained in the data pool DP. However, the present invention is not limited to this example and the management information may be read to, for example, the local memory 16 and a dedicated memory for reading the management information may be further provided.

Furthermore, the above-described embodiment has described a case where a generation block which is a unit for reading the management information of snapshots from the data pool DP is defined as explained with reference to FIG. 28. However, the present invention is not limited to this example and individual generation blocks may be defined with the content other than as described above.

INDUSTRIAL APPLICABILITY

The present invention can be applied to a wide variety of storage apparatuses equipped with the snapshot function.

REFERENCE SIGNS LIST

1 Computer system
3 Host computer
4 Disk array apparatus
10 Storage devices
11 Controller
15 Cache memory
19 CPU
20 Pair management table
21 Snapshot difference bitmap
22 Primary volume difference bitmap
23 Snapshot difference aggregated bitmap
24 Old data saving address table
25 Unused old-data-saving area bitmap
26 Old-data-saving unreflected bitmap
27 Split order number-generation number mapping table
28 Snapshot write difference bitmap
CK1 Management information storing chunk
CK2 Old data saving chunk
DPPL Data pool
PVOL Primary volume
SA1, SA2 Storage areas
SSVOL Snapshot volume
VOL Logical volume

The invention claimed is:

1. A storage apparatus comprising:
one or more storage devices for providing a storage area; and
a controller for creating first and second logical volumes in the storage area provided by the one or more storage devices and reading data from and/or writing data to the first logical volume in response to a request from a host computer, the controller being equipped with a memory,
wherein the controller:
obtains one or more snapshots, each of which are data images of the first logical volume at a certain point in time, and stores management information of each obtained snapshot in the second logical volume; and
reads the management information of a necessary snapshot of the one or more snapshots from the second logical volume to the memory when needed, executes processing using the read management information, and returns the management information, which becomes no longer necessary, from the memory to the second logical volume, and when reading the management information of the necessary snapshot from the second logical volume to the memory, the controller changes the number of generations in a generation block and address range of the management information of the necessary snapshot to be read to the memory whose management information is required according to a number of generations of snapshots existing at the time of the reading.

2. The storage apparatus according to claim 1,
wherein each snapshot is assigned a generation number that sequentially increases in the order of acquisition of the snapshot as a general rule, as information representing the generation of the snapshot; and
wherein when reading the management information of the snapshot from the second logical volume to the memory, as the generation number assigned to the snapshot whose the management information is required is smaller, the controller reads the management information of a small number of generations in a wider address range from the second logical volume to the memory; and as the generation number becomes larger, the controller reads the management information of a large number of generations in a narrower address range from the second logical volume to the memory.

3. The storage apparatus according to claim 2,
wherein the controller gradually changes the number of generations in a generation block and the address range of the management information when reading the management information of necessary snapshots from the second logical volume to the memory.

4. The storage apparatus according to claim 3,
wherein if the generation number assigned to the snapshot becomes an unused number as a result of deletion of the snapshot, the controller assigns that generation number to the snapshot which is newly obtained; and
wherein, on the other hand, even if any generation number belonging to a group including a generation of the smallest generation number becomes an unused number as a result of deletion of the snapshot to which that generation number is assigned, the controller does not assign that generation number to the newly obtained snapshot.

5. The storage apparatus according to claim 1,
wherein if it is necessary to update the management information over a plurality of generations of the snapshots when executing write processing for writing data to the first logical volume in response to a request from the host computer, the controller updates the management information of the snapshot of a latest generation and then updates the management information of the snapshot of another generation asynchronously with the write processing.

6. The storage apparatus according to claim 5,
wherein regarding the management information of the snapshot of the other generation, the controller updates the management information of the snapshot of the other generation when receiving a read request or a write request for the snapshot of the other generation.

7. The storage apparatus according to claim 6,
wherein the controller manages whether the snapshot of the other generation has been updated or not, before updating the management information of the snapshot of the other generation; and
wherein when updating the management information of the snapshot of the other generation, the controller updates the management information of the snapshot of the relevant other generation by skipping the updated snapshot.

8. A method for controlling a storage apparatus including:
one or more storage devices for providing a storage area; and
a controller for creating a first logical volume in the storage area provided by the one or more storage devices and reading data from and/or writing data to the first logical volume in response to a request from a host computer, the controller being equipped with a memory,
the storage apparatus control method comprising:
a first step executed by the controller creating a second logical volume in the storage area provided by the one or more storage devices;
a second step executed by the controller obtaining one or more snapshots, which are data images of the first logical volume at a certain point in time, and storing management information of each obtained snapshot in the second logical volume; and
a third step executed by the controller reading the management information of a necessary snapshot of the one or more snapshots from the second logical volume to the memory when needed, executing processing using the read management information, and returning the management information, which becomes no longer necessary, from the memory to the second logical volume;
wherein in the third step, when reading the management information of the necessary snapshot from the second logical volume to the memory, the controller changes the number of generations in a generation block and address range of the management information of the necessary snapshot to be read to the memory whose management information is required according to a number of generations of snapshots existing at the time of the reading.

9. The storage apparatus control method according to claim 8,
wherein each snapshot is assigned a generation number that sequentially increases in the order of acquisition of the snapshot as a general rule, as information representing the generation of the snapshot; and
wherein in the third step, when reading the management information of the snapshot from the second logical volume to the memory, as the generation number assigned to the snapshot whose the management information is required is smaller, the controller reads the management information of a small number of generations in a wider address range from the second logical volume to the memory; and as the generation number becomes larger, the controller reads the management information of a large number of generations in a narrower address range from the second logical volume to the memory.

10. The storage apparatus control method according to claim 9, wherein in the third step, the controller gradually changes the number of generations in a generation block and the address range of the management information when reading the management information of necessary snapshots from the second logical volume to the memory.

11. The storage apparatus control method according to claim 10,
wherein in the second and third steps, if the generation number assigned to the snapshot becomes an unused number as a result of deletion of the snapshot, the controller assigns that generation number to the snapshot which is newly obtained; and wherein, on the other hand, even if any generation number belonging to a group including a generation of the smallest generation number becomes an unused number as a result of deletion of the snapshot to which that generation number is assigned, the controller does not assign that generation number to the newly obtained snapshot.

12. The storage apparatus control method according to claim 8, wherein if it is necessary to update the management information over a plurality of generations of the snapshots when executing write processing for writing data to the first logical volume in response to a request from the host computer, the controller updates the management information of the snapshot of a latest generation and then updates the management information of the snapshot of another generation asynchronously with the write processing.

13. The storage apparatus control method according to claim 12, wherein regarding the management information of the snapshot of the other generation, the controller updates the management information of the snapshot of the other generation when receiving a read request or a write request for the snapshot of the other generation.

14. The storage apparatus control method according to claim 13,
wherein the controller manages whether the snapshot of the other generation has been updated or not, before updating the management information of the snapshot of the other generation; and
wherein when updating the management information of the snapshot of the other generation, the controller updates the management information of the snapshot of the relevant other generation by skipping the updated snapshot.

* * * * *